United States Patent
Baumgart et al.

(10) Patent No.: US 9,403,297 B2
(45) Date of Patent: *Aug. 2, 2016

(54) METHOD FOR PRODUCING MOLDED PARTS, ESPECIALLY FOR USE IN AUTOMOBILE MANUFACTURE, AND CORRESPONDING APPROPRIATE FILMS COMPRISING A COATING

(75) Inventors: Hubert Baumgart, Munster (DE); Horst Hintze-Bruning, Munster (DE); Fatmir Raka, Munster (DE); Gabriele Dlugosch, Worms (DE); Frank Dietsche, Schriesheim (DE); Nick Gruber, Mannheim (DE); Erich Beck, Ladenburg (DE); Reinhold Schwalm, Wachenheimr (DE); Klaus Menzel, Ludwigshafen (DE); Yvonne Heischkel, Mannheim (DE); Berthold Austrup, Nordkichen (DE)

(73) Assignee: BASF Coatings GmbH, Munster (DE)

( * ) Notice: Subject to any disclaimer, the term of this patent is extended or adjusted under 35 U.S.C. 154(b) by 2043 days.

This patent is subject to a terminal disclaimer.

(21) Appl. No.: 11/718,566

(22) PCT Filed: Oct. 17, 2005

(86) PCT No.: PCT/EP2005/011143
§ 371 (c)(1),
(2), (4) Date: May 3, 2007

(87) PCT Pub. No.: WO2006/048109
PCT Pub. Date: May 11, 2006

(65) Prior Publication Data
US 2009/0061215 A1    Mar. 5, 2009

(30) Foreign Application Priority Data
Nov. 4, 2004 (DE) .......................... 10 2004 053 247

(51) Int. Cl.
*B29C 41/20* (2006.01)
*C08G 18/67* (2006.01)
*C09D 175/16* (2006.01)
*C08G 18/73* (2006.01)
*C08G 18/74* (2006.01)
*B29C 37/00* (2006.01)
*C08G 18/72* (2006.01)
*C08G 18/32* (2006.01)

(52) U.S. Cl.
CPC .......... *B29C 37/0032* (2013.01); *C08G 18/672* (2013.01); *C09D 175/16* (2013.01); *B29C 2037/0042* (2013.01); *C08G 18/3212* (2013.01); *C08G 18/722* (2013.01); *Y10T 428/265* (2015.01)

(58) Field of Classification Search
CPC ...................... B29C 37/0032; B29K 2105/243; C08G 18/722; C08G 18/3212; C08G 18/672; C09D 175/16
See application file for complete search history.

(56) References Cited

U.S. PATENT DOCUMENTS

| 4,288,527 | A | 9/1981 | Morgan |
| 4,939,213 | A | 7/1990 | Jacobs, III et al. |
| 5,030,514 | A | 7/1991 | Hartman |
| 5,084,541 | A | 1/1992 | Jacobs, III et al. |
| 6,677,045 | B1 * | 1/2004 | Schwaim et al. .......... 428/424.2 |
| 2004/0175572 | A1 * | 9/2004 | Hintze-Bruning et al. 428/422.8 |

FOREIGN PATENT DOCUMENTS

| DE | 2003579 | | 7/1970 |
| DE | 3316593 | A1 | 11/1984 |
| DE | 3636183 | A1 | 3/1988 |
| DE | 3836370 | A1 | 5/1990 |
| DE | 19908018 | A1 | 8/2000 |
| DE | 19914896 | A1 | 10/2000 |
| DE | 10113273 | A1 | 9/2002 |
| DE | 10335620 | A1 | 3/2005 |
| DE | 102004010787 | A1 | 9/2005 |
| EP | 0002866 | B1 | 7/1981 |
| EP | 0054105 | A1 | 6/1982 |
| EP | 0144476 | B1 | 10/1987 |
| EP | 0352298 | B1 | 1/1990 |
| EP | 0403573 | B1 | 12/1990 |
| EP | 0624577 | A1 | 11/1994 |
| EP | 0819516 | A2 | 1/1998 |
| EP | 0995667 | B1 | 11/2002 |

(Continued)

OTHER PUBLICATIONS

International Search Report dated Dec. 28, 2005 for PCT/EP2005/011143.
Written Opinion for PCT/EP2005/011143 filed Oct. 17, 2005.
International Preliminary Report on Patentability for PCT/EP2005/011143 dated May 22, 2007.

*Primary Examiner* — Callie Shosho
*Assistant Examiner* — John Freeman
(74) *Attorney, Agent, or Firm* — Servilla Whitney LLC

(57) ABSTRACT

A process is disclosed for producing moldings, in which a pigmented coating composition (P) and a free-radically crosslinkable coating composition (K), which after crosslinking to completion produces a transparent coating (KE) are applied to a support sheet, wherein a dried but as yet not completely crosslinked coating (KT) is produced from the coating composition (K), the coated support sheet is shaped and is injection backmolded or foam-backed, and the coating (KT) is cured or aftercured; the crosslinkable coating composition (K) comprising a free-radically crosslinkable component (KK) which contains hydrogen bond forming structural elements.

15 Claims, No Drawings

(56) References Cited

FOREIGN PATENT DOCUMENTS

| | | | |
|---|---|---|---|
| EP | 1144476 B1 | 12/2003 | |
| WO | WO00/63015 A1 | 10/2000 | |
| WO | WO02/16461 A1 | 2/2002 | |
| WO | WO03/016095 A1 | 2/2003 | |

* cited by examiner

METHOD FOR PRODUCING MOLDED PARTS, ESPECIALLY FOR USE IN AUTOMOBILE MANUFACTURE, AND CORRESPONDING APPROPRIATE FILMS COMPRISING A COATING

CROSS REFERENCE TO RELATED APPLICATIONS

This application is a National Phase Application of Patent Application PCT/EP2005/011143 filed on 17 Oct. 2005, which claims priority to DE102004053247.8, filed 4 Nov. 2004.

FIELD

The present invention relates to a process for producing moldings, especially for use in automobile construction, wherein
I. a sheet (F) bearing a coating (B) is produced by applying, to an optionally pretreated surface (T1) of a thermoplastic support sheet (T)
  1. a pigmented coating composition (P) and
  2. a crosslinkable coating composition (K) which comprises a free-radically crosslinkable component (KK) and which after crosslinking to completion gives a transparent coating (KE),
  3. the coating composition (K) applied in stage 2 is dried and/or partially crosslinked, to give a coating (KT) as yet not crosslinked to completion,
II. the sheet (F) produced in stage I. is inserted into an opened mold,
III. the mold is closed, the side (T2) of the thermoplastic support sheet (T) not facing the surface (T1) is contacted with a liquid or softened polymeric material (KM), and the polymeric material is caused to solidify,
IV. the molding obtained in stage III. is removed from the mold, and
V. the coating (KT) is crosslinked to completion at any point in time in the course of the process,
the crosslinkable coating composition (K) comprising a free-radically crosslinkable component (KK) which
(i) comprises one or more oligo- and/or one or more polyurethane (meth)acrylates and
(ii) contains on average more than 1, preferably at least 2 and in particular more than 2 to 10.0 ethylenically unsaturated double bond(s) per molecule,
(iii) has a number-average molecular weight of from 1000 to 10 000 g/mol, preferably from 2000 to 5000 g/mol and more preferably from 2500 to 3500 g/mol,
(iv) has a double bond content of from 1.0 to 5.0 mol of double bonds per 1000 g of reactive component (KK), preferably a double bond content of from 1.5 to 4.0 mol of double bonds per 1000 g of reactive component (KK) and more preferably more than 2.0 to 3.5 mol of double bonds per 1000 g of reactive component (KK),
(v) contains on average per molecule >1, preferably ≥1.4, more preferably >2 branching points,
(vi) contains 5%-50% by weight, preferably 10%-40% by weight, more preferably 15%-30% by weight, based in each case on the weight of component (KK), of cyclic structural elements, and
(vii) contains at least one aliphatic structural element having at least 6 carbon atoms in the chain.

The present invention also relates to the use of the moldings thus obtainable and to sheets (F) that are suitable for the process and bear a coating.

BACKGROUND

Moldings comprising a polymeric material which has been provided with a sheet are known to the skilled worker. Instead of laminating or adhering a sheet to plastic components, an increasing trend nowadays, in industrial applications as well, is to switch to backing the sheets with the polymeric material directly in the shaping mold, by injection or compression molding or foaming (A. Grefenstein, "Folienhinterspritzen statt Lackieren, Neue Technik für Karosseriebauteile aus Kunststoff" [Injection backmolding of sheets instead of coating: New technology for plastic bodywork components] in Metalloberflache, 10/99, vol. 53, Carl Hanser Verlag, Munich, 1999).

The multilayer color and/or effect sheets used for producing the moldings comprise, as is known, a backing sheet, at least one color and/or effect basecoat and a clearcoat. They correspond in their construction to the conventional multilayer color and/or effect paint systems.

Particularly in the field of automobile painting, however, a multiplicity of requirements are imposed on the appearance of the molding's surfaces on the sheet side (cf., e.g., European patent EP 0 352 298 B1, page 15 line 42 to page 17 line 40).

The solutions proposed in the prior art, however, do not allow adequate meeting of these requirements, requirements which are usual in the field of automobile painting. Moreover, some of the solutions proposed in the prior art are even contradictory in respect of the glass transition temperature that is to be set for the radiation-crosslinkable clearcoat materials used.

For instance, WO 00/63015 discloses a process of the aforementioned kind for producing moldings, in which the crosslinkable coating composition (K) is composed of a radiation-crosslinkable material which comprises a binder having a glass transition temperature of above 40° C. The transparent coatings (KE), crosslinked to completion, that are obtained in this process have unsatisfactory properties, however. In particular the crosslinking of the transparent coating (KE) is inadequate.

Moreover, the pigmented coating composition used in the process described in WO 00/63015 comprises thermoplastic polymers containing dyes or pigments dispersed in the polymer layer. This color layer is applied by extrusion, while the use of solventborne or aqueous, pigmented coating compositions and their application techniques are not described.

EP-A-819 516, furthermore, discloses a process for producing moldings, in which a sheet that has been provided with a coating is inserted into a mold, the mold is closed and contacted with a polymeric material (KM) and the polymeric material (KM) is solidified, the process having the characteristic feature that the coating material is only partly crosslinked before the polymeric material is introduced, and is only crosslinked to completion during and/or after the introduction of the polymeric material (KM). Preference in the process is given to using radiation-crosslinkable coating compositions having a glass transition temperature of below 40° C., based in particular on urethanes. However, further information on the constitution of suitable coating compositions is absent.

EP-B-403 573, moreover, describes a sheet which has been provided with a coating and is intended for use in the thermoforming process, an essential feature being that a clearcoat material which is uncrosslinked or has a low degree of crosslinking, and has a glass transition temperature of below 20° C., forms at least part of the clearcoat film.

EP-B-1 144 476, finally, discloses coating compositions which are referred to as dual-cure compositions, being curable both by thermal addition and by radiation-induced addition, and discloses their use for producing thermoformable dry-paint films. The coating compositions described therein, however, contain free isocyanate groups, which are needed for the thermal cure. The coating compositions therefore have a relatively complex physical composition. Moreover, operational control is difficult when the aim is to avoid uncontrolled curing of the thermally reactive constituents during the thermal operating steps, such as the thermoforming at elevated temperature, for example.

DETAILED DESCRIPTION OF THE INVENTION

Problem

The problem to be addressed by the present invention was therefore to provide a process for producing moldings, in which adequate crosslinking of the coating compositions (K) is ensured, on the one hand. On the other hand, however, the coating (KT) as yet not crosslinked to completion must no longer flow and must not be marked by any protective sheet that may be applied.

Thus, particularly in the case where the moldings are used in the automobile industry, the moldings ought to satisfy, in terms of their appearance on the sheet side, the requirements for what is known as a class A surface.

Additionally the moldings, in terms of their appearance on the sheet side, ought to meet the requirements normally imposed on an automobile finish (cf. European patent EP 0 352 298 B1, page 15 line 42 to page 17 line 40). Thus, in particular, not only the weathering stability but also the chemical resistance of the transparent coating (KE) crosslinked to completion must not be inferior to those of conventional automobile clearcoat films. Finally the coating (KE) after crosslinking to completion ought to have sufficient scratch resistance.

Solution to the Problem

This problem is solved, surprisingly, by means of a process of the aforementioned kind, wherein
the free-radically crosslinkable component (KK) comprises hydrogen bond forming structural elements in an amount such that
1. a transparent coating (MT) produced from the mixture (M) but as yet not crosslinked to completion has a ratio of storage modulus G(MT)' to loss modulus G(MT)'' of from 5 to 200, preferably from 8 to 100, more preferably from 10 to 80, G(MT)' and G(MT)'' having been measured at a temperature of 20° C. by rheological oscillation measurements using a plate/plate measuring system with a heating rate of 2° C. per minute and a circular frequency of $10\ s^{-1}$, and
2. a transparent coating (ME) produced from the mixture (M) and crosslinked to completion has a storage modulus E(ME)' of from $1.0*10^{7.0}$ to $8.0*10^{7.0}$ Pa, preferably from $1.5*10^{7.0}$ to $4.5*10^{7.0}$ Pa, more preferably from $1.9*10^{7.0}$ to $3.7*10^{7.0}$ Pa, E(ME)' having been measured in the rubber-elastic range on free, completely crosslinked films having a layer thickness of 40 μm+/− 10 μm by means of dynamic mechanical thermoanalysis with a heating rate of 2° C. per minute and a frequency of 1 Hz, the mixture (M) having been obtained by mixing 100 parts of component (KK), at 70% in methyl ethyl ketone, (corresponding to 143 parts of the 70% strength solution) with 2.4 parts of 1-hydroxycyclohexyl phenyl ketone, used in the form of 3.0 parts of an 80% strength solution in acetone and 0.8 part of ethyl 2,4,6-trimethylbenzoylphenylphosphinate and also 1.0 part of a mixture of bis(1,2,2,6,6-pentamethyl-4-piperidinyl) sebacate and methyl (1,2,2,6,6-pentamethyl-4-piperidinyl)sebacate, 2.0 parts of a mixture of 2-(4-((2-hydroxy-3-tridecyloxypropyl)oxy)-2-hydroxyphenyl)-4,6-bis(2,4-dimethylphenyl)-1,3,5-triazine and 2-(4-((2-hydroxy-3-dodecyloxypropyl)oxy)-2-hydroxyphenyl)-4,6-bis(2,4-dimethylphenyl)-1,3,5-triazine, used in the form of 2.4 parts of an 85% strength solution in 1-methoxy-2-propanol 0.2 part of a polyether-modified polydimethylsiloxane, used in the form of 1.7 parts of a solution of the polydimethylsiloxane in 7/2 xylene/monophenyl glycol, having a nonvolatiles fraction of 12.5%, and 70.0 parts of 3-butoxy-2-propanol.

The present invention also provides for the sheets (F) which bear a coating (B) and are used in the process, and the moldings provided with the sheet (F), and provides for use thereof.

Advantages of the Invention

It is surprising and was not foreseeable that through the use of the specific component (KK) in the crosslinkable coating compositions (K) coatings are obtained in which, on the one hand, the coating (KT) as yet not crosslinked to completion no longer flows and is not marked by any protective film that may be applied, and, on the other hand, crosslinking of the coating compositions (K) in the course of curing to completion is sufficient.

Suitable specific free-radically crosslinkable components (KK) can be provided via control of the hydrogen bond content.

With the process of the invention, therefore, moldings are provided which in terms of their appearance on the sheet side ensure class A surfaces and meet the requirements normally imposed on an automobile finish (cf. European patent EP 0 352 298 B1, page 15 line 42 to page 17 line 40). Thus, in particular, both the weathering stability and the chemical resistance of the completely crosslinked transparent coating (KE) are not inferior to those of conventional automobile clearcoat films. The coating (KE) after crosslinking to completion, finally, also has sufficient scratch resistance.

The Materials Used in the Process of the Invention
The Sheet (F) Bearing a Coating (B)
Crosslinkable Coating Composition (K)

It is surprising, and was not foreseeable, that only through measurement of the viscoelastic properties by means of rheological measurements in the case of the coating as yet not crosslinked to completion (MT) or by means of dynamic mechanical thermoanalysis (also called DMTA for short in the text below) on free films in the case of the coating crosslinked to completion (ME) was a universal, representative selection criterion available for the provision of free-radically crosslinkable components (KK) and hence also of suitable crosslinkable coating compositions (K) which can be used to provide coatings having the desired properties.

It is therefore essential to the invention that
1. a transparent coating (MT) produced from the mixture (M) but as yet not crosslinked to completion has a ratio of storage modulus G(MT)' to loss modulus G(MT)" of from 5 to 200, preferably from 8 to 100, more preferably from 10 to 80, G(MT)' and G(MT)" having been measured at a temperature of 20° C. by rheological oscillation measurements using a plate/plate measuring system with a heating rate of 2° C. per minute and a circular frequency of 10 $s^{-1}$, and 2. a transparent coating (ME) produced from the mixture (M) and crosslinked to completion has a storage modulus E(ME)' of from $1.0*10^{7.0}$ to $8.0*10^{7.0}$ Pa, preferably from $1.5*10^{7.0}$ to $4.5*10^{7.0}$ Pa, more preferably from $1.9*10^{7.0}$ to $3.7*10^{7.0}$ Pa, E(ME)' having been measured in the rubber-elastic range on free, completely crosslinked films having a layer thickness of 40 μm+/−10 μm by means of dynamic mechanical thermoanalysis with a heating rate of 2° C. per minute and a frequency of 1 Hz.

Rheological oscillation measurements with the plate/plate measuring system are common knowledge for the determination of the viscoelastic properties of coating compositions and have been described for example in Thomas Mezger, Das Rheologie-Handbuch, Vincentz Verlag, ISBN 3-87870-567-0, pages 208 to 212.

The measurements can be conducted using, for example, the instrument MCR 300 from the company Physica (plate/plate measuring system, 25 mm diameter) with a circular frequency of 10 $s^{-1}$ and an amplitude of 0.1%.

The heating rate in the case of the rheological measurements is 2° C. per minute.

The ratio of storage modulus G(MT)' to loss modulus G(MT)" is measured on coatings (MT) that are prepared from the mixture (M) and dried but not yet crosslinked to completion. These dried coatings (MT) as yet not crosslinked to completion are prepared in a known way by dissolving 100 parts of component (KK), at 70% in methyl ethyl ketone (corresponding to 143 parts of the 70% strength solution), with 2.4 parts of 1-hydroxycyclohexyl phenyl ketone (especially commercial product Irgacure® 184 from Ciba Geigy), used in the form of 3.0 parts of an 80% strength solution in acetone and 0.8 part of ethyl 2,4,6-trimethylbenzoylphenylphosphinate (especially commercial product Lucirin® TPO L from BASF AG) and also 1.0 part of a mixture of bis(1,2,2,6,6-pentamethyl-4-piperidinyl) sebacate and methyl (1,2,2,6,6-pentamethyl-4-piperidinyl) sebacate (especially commercial product Tinuvin® 292 from Ciba Geigy), 2.0 parts of a mixture of 2-(4-((2-hydroxy-3-tridecyloxypropyl)oxy)-2-hydroxyphenyl)-4,6-bis(2,4-dimethylphenyl)-1,3,5-triazine and 2-(4-((2-hydroxy-3-dodecyloxypropyl)oxy)-2-hydroxyphenyl)-4,6-bis(2,4-dimethylphenyl)-1,3,5-triazine (used in the form of 2.4 parts of a commercially customary 85% strength solution in 1-methoxy-2-propanol, especially commercial product Tinuvin® 400 from Ciba Geigy) and 0.2 part of a polyether-modified polydimethylsiloxane, used in the form of 1.7 parts of a solution of the polydimethylsiloxane in 7/2 xylene/monophenylglycol with a nonvolatiles content of 12.5% (especially commercial product Byk® 306 from Byk Chemie) in 3-butoxy-2-propanol and adjusting the solution with 3-butoxy-2-propanol to a solids content of 48%.

The mixture (M) thus obtained is knife coated in the absence of UV light onto a polyethylene terephthalate sheet using the Linecoater from the company Coatema GmbH, Dormagen, by means of box-type coating bar, in a width of 37 cm and with a wet film thickness of 200 μm. The coated sheet then runs at a speed of 0.2 m/min into a flashoff tunnel, where it resides for 20 minutes at a temperature of 25° C. and a relative humidity of 65%. The coated sheet is subsequently dried in an oven at an oven air temperature of 119° C. for 15 minutes. Thereafter the dried coating film is scraped from the coated sheet with a scraper and used for rheological testing.

Dynamic mechanical thermal analysis is a widely known measurement method for determining the viscoelastic properties of coatings and is described in, for example, Murayama, T., Dynamic Mechanical Analysis of Polymeric Material, Elsevier, New York, 1978 and Loren W. Hill, Journal of Coatings Technology, Vol. 64, No. 808, May 1992, pages 31 to 33.

The measurements can be conducted, for example, using the DMTA V instrument from the company Rheometrics Scientific, at a frequency of 1 Hz and an amplitude of 0.2%.

The storage modulus E' in the rubber-elastic range is measured on homogeneous free films which have been crosslinked to completion. The free films are produced in a known way by dissolving 100 parts of component (KK), at 70% in methyl ethyl ketone (corresponding to 143 parts of the 70% strength solution), with 2.4 parts of 1-hydroxycyclohexyl phenyl ketone (especially commercial product Irgacure® 184 from Ciba Geigy), used in the form of 3.0 parts of an 80% strength solution in acetone, and 0.8 part of ethyl 2,4,6-trimethylbenzoylphenylphosphinate (especially commercial product Lucirin® TPO L from BASF AG) and also 1.0 part of a mixture of bis(1,2,2,6,6-pentamethyl-4-piperidinyl) sebacate and methyl (1,2,2,6,6-pentamethyl-4-piperidinyl) sebacate (especially commercial product Tinuvin® 292 from Ciba Geigy), 2.0 parts of a mixture of 2-(4-((2-hydroxy-3-tridecyloxypropyl)oxy)-2-hydroxyphenyl)-4,6-bis(2,4-dimethylphenyl)-1,3,5-triazine and 2-(4-((2-hydroxy-3-dodecyloxypropyl)oxy)-2-hydroxyphenyl)-4,6-bis(2,4-dimethylphenyl)-1,3,5-triazine (used in the form of 2.4 parts of a commercially customary 85% strength solution in 1-methoxy-2-propanol, especially commercial product Tinuvin® 400 from Ciba Geigy) and 0.2 part of a polyether-modified polydimethylsiloxane, used in the form of 1.7 parts of a solution of the polydimethylsiloxane in 7/2 xylene/monophenylglycol with a nonvolatiles content of 12.5% (especially commercial product Byk® 306 from Byk Chemie) in 3-butoxy-2-propanol and adjusting the solution with 3-butoxy-2-propanol to a solids content of 48%.

The mixture (M) thus obtained is applied to substrates to which the resulting coating does not stick. Examples that may be mentioned of suitable substrates include glass, Teflon, polyethylene terephthalate and polypropylene, especially polypropylene. The resultant coating is dried in the manner described for the rheological measurements and is subsequently crosslinked to completion using UV light with a dose of 1.9 J/cm$^2$ under inert conditions with a residual oxygen content of 200 ppm. The unit used was an IST belt unit with a high-pressure Hg lamp and the Light Bug IL 390C dosimeter.

The thickness of the free films used for the measurement is generally 40±10 μm. The heating rate is 2° C. per minute.

Surprisingly it has been found that moldings in their appearance on the sheet side, having the desired properties, are obtained when the coating composition (K) comprises a free-radically crosslinkable component (KK) selected such that the transparent coating (MT) produced from the mixture (M) but as yet not crosslinked to completion, and the transparent coating (ME) produced from the mixture (M) and crosslinked to completion, have very specific values for the ratio of storage modulus G(MT)' to loss modulus G(MT)" and very specific values for the storage modulus E(ME)', respectively.

In other words, a skilled person is able to obtain coating compositions (K) suitable for the process of the invention by using a reactive component (KK) which features the stated parameters (i) to (vii) and also a precisely defined level of structural elements that form H bonds. From this component (KK) he or she then prepares—as described above under the heading Solution to the Problem—in each case the mixture (M) by adding the indicated quantities of precisely defined additives and solvents, and, by means of precisely described measurements, determines the stated viscoelastic parameters from the resulting coatings (MT) that are as yet not crosslinked to completion and also from the resulting coatings (ME) that have been crosslinked to completion.

As is apparent from the description below of the constitution of the coating composition (K), this mixture (M) can also be used directly as coating composition (K). It will be appreciated, however, as set out in detail below, that it is also possible to prepare the coating composition (K) using said component (KK) used for the mixture (M), but using, for example, other photoinitiators and/or additives and/or solvents and/or other constituents.

It is the case here that the resistance of the sheet bearing the transparent coating (KT) as yet not crosslinked to completion is generally particularly high during film processing (resistance meaning on the one hand that the coating (KT) as yet not crosslinked to completion no longer flows and is not marked by any protective sheet that may be applied) when the ratio of storage modulus G(MT)' to loss modulus G(MT)" at a temperature of 20° C. of the dried but as yet not crosslinked transparent coating (MT) is as high as possible.

If, on the other hand, the ratio of storage modulus G(MT)' to loss modulus G(MT)" at a temperature of 20° C. of the transparent coating (MT) dried but as yet not crosslinked to completion is very low, then the mobility of the reactants in the course of crosslinking to completion is particularly high and therefore, with a given functionality and with a given amount of double bonds per molecule, it is possible to achieve a good crosslinking density in the completely crosslinked coating (KE).

Moreover, there is generally an increase in the scratch resistance of the completely crosslinked transparent coating (KE) with increasing storage modulus E(ME)' of the completely crosslinked transparent coating (ME) in the rubber-elastic range.

If the storage modulus E(ME)' of the completely crosslinked transparent coating (ME) in the rubber-elastic range is too high, however, the completely crosslinked transparent coating becomes too brittle. In that case the completely crosslinked transparent coating (KE) exhibits an increased tendency toward stress cracks after UV curing.

The stated viscoelastic variables, namely the storage modulus and the loss modulus of the transparent coating (MT) as yet not crosslinked to completion, and also the storage modulus of the transparent coating (ME) crosslinked to completion, can be controlled via structural parameters of the crosslinkable component (KK). Thus, for example, the double bond content, the molecular weight, the double bond equivalent weight, the nature and amount of rigid structural units, and the amount of hydrogen bond forming structural units have an influence on the said viscoelastic variables.

It is therefore initially important that the free-radically crosslinkable component (KK) present in the crosslinkable coating component (K) comprises one or more oligourethane (meth)acrylates and/or one or more polyurethane (meth)acrylates.

Here and in the text below, an oligomer is a compound generally containing on average from 2 to 10 base structures or monomer units. A polymer, in contrast, is a compound generally containing on average more than 10 base structures or monomer units. Mixtures or physical entities of this kind are also referred to by those skilled in the art as binders or resins.

In contradistinction thereto, here and in the text below, a low molecular mass compound is a compound derived essentially only from one base structure or one monomer unit.

The free-radically crosslinkable component (KK) contains preferably at least 50%, more preferably at least 70% and very preferably at least 80% by weight, based in each case on the solids content of component (KK), of one or more oligourethane (meth)acrylates and/or one or more polyurethane (meth)acrylates. In particular the free-radically crosslinkable component is composed 100% of one or more oligourethane (meth)acrylates and/or one or more polyurethane (meth)acrylates.

Moreover, the free-radically crosslinkable component (KK) contains preferably not more than 50%, more preferably not more than 30% and very preferably not more than 20% by weight of further free-radically crosslinkable constituents, and in particular contains no such substituents.

The free-radically crosslinkable component (KK) contains preferably less than 5%, more preferably less than 1%, by weight, based in each case on the weight of component (KK), of detectable free isocyanate groups, and in particular contains substantially no such isocyanate groups.

It is also preferred for the free-radically crosslinkable component (KK) present in the crosslinkable coating composition (K) to comprise a mixture of different oligo- and/or poly-urethane (meth)acrylates, which may also have different double bond contents, molecular weights, double bond equivalent weights, and may differ in their amount of branching points and their amount of cyclic and relatively long-chain aliphatic structural elements and amount of hydrogen bond forming structures. The determining factor is that component (KK) has on average the parameter values indicated below.

This mixture can be obtained by mixing different oligo- and/or poly-urethane (meth)acrylates or as a result of the simultaneous formation of different products during the preparation of a corresponding oligo- and/or poly-urethane (meth)acrylate.

Besides the urethane (meth)acrylates, suitable further free-radically crosslinkable constituents of component (KK) include monomers, but preferably oligomers and/or polymers, especially polyester (meth)-acrylates, epoxy (meth)acrylates, (meth)acryloyl-functional (meth)acrylic copolymers, polyether (meth)acrylates, unsaturated polyesters, amino (meth)acrylates, melamine (meth)acrylates and/or silicone (meth)acrylates, preferably polyester (meth)acrylates and/or epoxy (meth)acrylates and/or polyether (meth)acrylates.

In order to obtain effective crosslinking it is preferred to use free-radically crosslinkable components (KK) featuring high reactivity of the functional groups, more preferably free-radically crosslinkable components (KK) which contain acrylic double bonds as functional groups.

The urethane (meth)acrylates can be prepared in a manner known to the skilled worker from isocyanate-functional compound and at least one compound containing groups that are reactive toward isocyanate groups, by mixing the components in any order, where appropriate at elevated temperature.

It is preferred in this case to add the compound containing isocyanate-reactive groups to the isocyanate-functional compound, preferably in two or more steps.

The urethane (meth)acrylates are obtained in particular by initially introducing the di- or polyisocyanate and subsequently adding at least one hydroxyalkyl (meth)acrylate or hydroxyalkyl ester of other ethylenically unsaturated carboxylic acids, and so first reacting some of the isocyanate groups. Thereafter a chain extender from the group of the diols/polyols and/or diamines/polyamines and/or dithiols/polythiols and/or alkanolamines is added and in that way the remaining isocyanate groups are reacted with the chain extender.

A further possibility is to prepare the urethane (meth)acrylates by reacting a di- or polyisocyanate with a chain extender and then reacting the remaining free isocyanate groups with at least one ethylenically unsaturated hydroxyalkyl ester.

It will be appreciated that all of the hybrid forms of these two methods are also possible. For example, some of the isocyanate groups of a diisocyanate can be reacted first with a diol, and then a further portion of the isocyanate groups can be reacted with the ethylenically unsaturated hydroxyalkyl ester, after which the remaining isocyanate groups can be reacted with a diamine.

In general the reaction is conducted at temperatures between 5 and 100° C., preferably between 20 to 90° C. and more preferably between 40 and 80° C., and in particular between 60 and 80° C.

It is preferred in this case to operate under water-free conditions. Water-free here means that the water content in the reaction system is not more 5%, preferably not more than 3% and more preferably not more than 1% by weight.

In order to suppress polymerization of the polymerizable double bonds it is preferred to operate under an oxygen-containing gas, more preferably air or air/nitrogen mixtures.

As oxygen-containing gas it is possible with preference to use air or a mixture of oxygen or air and a gas which is inert under the conditions of use. The inert gas used may comprise nitrogen, helium, argon, carbon monoxide, carbon dioxide, steam, lower hydrocarbons or mixtures thereof.

The oxygen content of the oxygen-containing gas may be for example between 0.1% and 22% by volume, preferably from 0.5% to 20%, more preferably from 1% to 15%, very preferably from 2% to 10%, and in particular from 4% to 10% by volume. It will be appreciated that higher oxygen contents can also be used if desired.

The reaction may also be conducted in the presence of an inert solvent, examples being acetone, isobutyl methyl ketone, methyl ethyl ketone, toluene, xylene, butyl acetate or ethoxyethyl acetate.

Via the selection of the nature and amount of di- and/or polyisocyanate, chain extender and hydroxyalkyl esters used, control is exerted over the further variables of the urethane (meth)acrylates, such as, for example, double bond content, double bond equivalent weight, amount of branching points, amount of cyclic structural elements, amount of aliphatic structural elements having at least 6 carbon atoms, amount of hydrogen bond forming structural elements, and the like.

Through the selection of the particular amounts of di- or polyisocyanate and chain extender used and also through the functionality of the chain extender it is also possible, furthermore, to prepare urethane (meth)acrylates which besides the ethylenically unsaturated double bonds also contain other functional groups, examples being hydroxyl groups, carboxyl groups, amino groups and/or thiol groups or the like. The urethane (meth)acrylates preferably also contain hydroxyl groups and/or carboxyl groups.

Particularly if the urethane (meth)acrylates are to be used in aqueous coating compositions (K), some of the free isocyanate groups in the reaction mixtures are further reacted with compounds which contain an isocyanate-reactive group, preferably selected from the group consisting of hydroxyl, thiol, and primary and secondary amino groups, especially hydroxyl groups, and at least one, especially one, acid group, preferably selected from the group consisting of carboxyl groups, sulfonic acid groups, phosphoric acid groups and phosphonic acid groups, especially carboxyl groups. Examples of suitable compounds of this kind are hydroxyacetic acid, hydroxypropionic acid or gamma-hydroxybutyric acid, especially hydroxyacetic acid.

The polyester (meth)acrylates that are suitable in addition to the urethane (meth)acrylates are known in principle to the skilled worker. They can be prepared by a variety of methods. For example it is possible to use acrylic and/or methacrylic acid directly as an acid component in the synthesis of the polyesters. Another possibility is to use hydroxyalkyl esters of (meth)acrylic acid as an alcohol component directly in the synthesis of the polyesters. Preferably, however the polyester (meth)acrylates are prepared by acrylating polyesters. By way of example it is possible first to synthesize hydroxyl-containing polyesters, which are then reacted with acrylic or methacrylic acid. It is also possible first to synthesize carboxyl-containing polyesters, which are then reacted with a hydroxyalkyl ester of acrylic or methacrylic acid. Unreacted (meth)acrylic acid can be removed from the reaction mixture by washing, distillation or, preferably, by reaction with an equivalent amount of a monoepoxide or diepoxide compound, using appropriate catalysts, such as triphenylphosphine, for example. For further details of the preparation of polyester acrylates reference may be made in particular to DE-A 33 16 593 and DE-A 38 36 370 and also to EP-A-54 105, DE-B 20 03 579 and EP-B-2866.

The polyether (meth)acrylates that are also suitable are known as well in principle to the skilled worker. They can be prepared by a variety of methods. By way of example it is possible to obtain hydroxyl-containing polyethers, which are esterified with acrylic acid and/or methacrylic acid, by reacting dihydric and/or polyhydric alcohols with various amounts of ethylene oxide and/or propylene oxide in accordance with well-known methods (cf. e.g. Houben-Weyl, volume XIV, 2, Macromolecular Compounds II, (1963)). It is also possible to use polymerization products of tetrahydrofuran or of butylene oxide.

Via the selection of the nature and amount of alcohol component and acid component used control is exerted over the further variables of the polyether (meth)acrylates and polyester (meth)acrylates, such as, for example, double bond content, double bond equivalent weight, amount of branching points, amount of cyclic structural elements, amount of aliphatic structural elements having at least 6 carbon atoms, amount of hydrogen bond forming structural elements, and the like.

Suitable epoxy (meth)acrylates are also well known to the skilled worker, moreover, and therefore require no further elucidation. They are normally prepared by addition reaction of acrylic acid with epoxy resins, such as with epoxy resins based on bisphenol A or with other commercially customary epoxy resins, for example.

It is further essential to the invention that the free-radically crosslinkable component (KK) contains on average more than 1, preferably at least 2, ethylenically unsaturated double bond(s) per molecule. With particular preference the free-radically crosslinkable component (KK) contains more than 2 up to a maximum 100, in particular 3.0 to 9.5, preferably 3.5 to 9.0 and very preferably 4.0 to 8.5 double bonds per molecule.

In general the free-radically crosslinkable component (KK) contains not more than 10% by weight of compounds containing only one curable group, preferably not more than 7.5%, more preferably not more than 5%, very preferably not more than 2.5%, in particular not more than 1%, and especially 0% by weight.

Increasing double bond content per molecule of the free-radically crosslinkable component (KK) is generally accompanied by an increase in the crosslinking density of the transparent coating (KE) crosslinked to completion. This means that, as the double bond content per molecule of the free-radically crosslinkable component (KK) increases there is also an increase in the storage modulus E(ME)' of the completely crosslinked transparent coating (ME) in the rubber-elastic range.

At the same time, however, increasing double bond content per molecule of the free-radically crosslinkable component (KK) is accompanied by a decrease in the breaking elongation of the completely crosslinked transparent coating (KE); in other words, the system becomes more brittle. Therefore the completely crosslinked transparent coating (ME) and hence, in general, the completely crosslinked transparent coating (KE) as well exhibits an increased tendency toward stress cracks after UV curing as the double bond content per molecule increases.

Additionally, for the given class of the urethane (meth) acrylates, increasing double bond content per molecule in component (KK) is generally accompanied by a decrease in the ratio of storage modulus G(MT)' to loss modulus G(MT)" at a temperature of 20° C. of the transparent coating (MT) which has been dried but not yet crosslinked to completion.

As will be appreciated, however, not only the double bond content but also the other variables of the reactive component (KK) (such as, for example, molecular weight, number of branching points, number of cyclic structural elements, number of hydrogen bond forming structural elements, etc.) also have an influence on the viscoelastic properties (cf. also the effects set out below of the respective variables on the viscoelastic properties not only of the coating (MT) as yet not crosslinked to completion but also of the coating (ME) crosslinked to completion). Consequently, these statements set out above relating to the influence of the double bond content on the viscoelastic properties, and also the effects on the viscoelastic properties that are cited later on below, in the discussion of the influence of the other variables, are valid in each case only subject to the hypothetical condition that only one parameter at a time is being considered, such as the double bond content here, while the other parameters are not specifically altered.

As described above, the double bonds are generally introduced into component (KK) by reacting one or more ethylenically unsaturated hydroxyalkyl esters with the isocyanate groups of the isocyanate and/or of the isocyanate prepolymer in the case of the urethane (meth)acrylates and/or with the acid groups of the polyester in the case of the polyester (meth)acrylates. It is likewise possible, as described above, to react the starting oligomers or starting polymers, such as polyesters, polyethers, epoxides and acrylate polymers, for example, with acrylic and/or methacrylic acid and/or another ethylenically unsaturated acid.

Examples of suitable ethylenically unsaturated hydroxyalkyl esters are hydroxyalkyl esters of acrylic and methacrylic acid, of maleic and fumaric acid, of crotonic and isocrotonic acid and of vinylacetic acid, preferably ethylenically unsaturated hydroxyalkyl esters of acrylic acid. More preferably the ethylenically unsaturated hydroxyethyl and/or hydroxypropyl and/or hydroxybutyl and/or hydroxypentyl and/or hydroxyhexyl esters, very preferably ethylenically unsaturated hydroxyethyl esters or ethylenically unsaturated hydroxyethyl esters together with ethylenically unsaturated hydroxybutyl esters of the stated unsaturated acids are used, particularly those of acrylic acid.

It will be appreciated that for introducing the double bonds into component (KK) it is also possible to use hydroxyalkyl esters having more than one double bond per molecule, such as pentaerythrityl diacrylate, triacrylate and tetraacrylate or the like.

With very particular preference the double bonds are introduced into component (KK) using 2-hydroxyethyl acrylate and/or 4-hydroxybutyl acrylate and/or pentaerythrityl triacrylate.

The compound used to introduce the double bonds, depending on its structure, under certain circumstances itself affects the viscoelastic variables, since not only the double bond content but also, under certain circumstances, other variables as well, such as the urethane group content, for example, are altered. If, for example, the double bond content of component (KK) is increased by replacing some of the chain extender by hydroxyethyl acrylate, then the urethane group content will be altered in accordance with the mass ratio of chain extender to hydroxyethyl acrylate. If, on the other hand, the double bond content of component (KK) is increased, for example, by using hydroxyalkyl esters having more than one double bond per molecule instead of hydroxyethyl acrylate, such as by using pentaerythrityl triacrylate and/or pentaerythrityl tetraacrylate, for example, then the urethane group content is lowered moderately.

It is further essential to the invention that the free-radically crosslinkable component (KK) has a number-average molecular weight of from 1000 to 10 000 g/mol, preferably from 2000 to 5000 g/mol and more preferably from 2500 to 3500 g/mol.

The higher the molecular weight of the reactive component (KK) the lower the storage modulus E(ME)' of the completely crosslinked transparent coating (ME) in the rubber-elastic range.

At the same time, the higher the molecular weight of the reactive component (KK), the higher, generally, the ratio of storage modulus G(MT)' to loss modulus G(MT)" at a temperature of 20° C. of the transparent coating (MT) which has been dried but as yet not crosslinked to completion.

Moreover it is essential to the invention that the free-radically crosslinkable component (KK) has a double bond content of from 1.0 to 5.0 mol of double bonds per 1000 g of reactive component (KK), preferably a double bond content of from 1.5 to 4.0 mol of double bonds per 1000 g of reactive component (KK) and more preferably a double bond content of more than 2.0 to 3.5 mol of double bonds per 1000 g of reactive component (KK), the values being based in each case on the weight of the free-radically crosslinkable component (KK), but of course excluding nonreactive compounds, such as solvents, water or additives, for example.

As the skilled worker will be aware, the double bond content of component (KK) is connected not only with the amount of double bonds per molecule but also, in particular, with the number-average molecular weight of component (KK).

As the double bond content of component (KK) drops there is an improvement in the capacity of the transparent coating (KT) which has been dried but as yet not crosslinked to completion to no longer flow and to be no longer marked by any protective film that may be applied. This means that, as the double bond content of component (KK) drops, in particular because of the increase in hydrogen bond forming structures this generally entails and/or because of the increased molecular weight of component (KK), there is an increase in the ratio of storage modulus G(MT)' to loss modulus G(MT)" at a temperature of 20° C. of the transparent coating (MT) which has been dried but as yet not crosslinked to completion.

Decreasing double bond content of component (KK) is accompanied by a decrease in the storage modulus E(ME)' in the rubber-elastic range of the transparent coating (ME) which has been crosslinked to completion.

As the skilled worker is aware, the molecular weight and the double bond content can be adjusted by way of the nature and amount of the building block components used and also by way of the reaction conditions.

It is further essential to the invention that the free-radically crosslinkable component (KK) contains on average per molecule >1, preferably ≥1.4, more preferably >2, branching points.

A reduction in the average number of branching points per molecule in component (KK) is generally accompanied by a decrease in the storage modulus E(ME)' of the completely crosslinked transparent coating (ME) in the rubber-elastic range. At the same time, with a reduction in the average number of branching points per molecule, there is generally a decrease in the ratio of storage modulus G(MT)' to loss modulus G(MT)" at a temperature of 20° C. of the transparent coating (MT) which has been dried but as yet not crosslinked to completion.

The average number of branching points per molecule in component (KK) is generally adjusted by way of the amount of compounds used for synthesizing component (KK) that have a functionality of more than 2, in particular a functionality of at least 3.

The branching points of the free-radically crosslinkable component (KK) are preferably introduced via the use of isocyanates having a functionality of more than 2, in particular having a functionality of at least 3.

With particular preference the branching points are introduced by using trimeric and/or polymeric isocyanates, especially isocyanurates, and/or adducts or prepolymers having an isocyanate functionality of more than 2, especially allophanates and/or biurets, for preparing the oligo- and/or polyurethane (meth)acrylates employed in the free-radically crosslinkable component (KK). With very particular preference the branching points are introduced via the use of one or more isocyanurates and/or one or more biurets.

It is, however, also possible, when synthesizing the free-radically crosslinkable component (KK), to use alcohols, thiols or amines having a functionality of more than 2, through the use for example of pentaerythritol, dipentaerythritol, trimethylolethane, trimethylolpropane, ditrimethylolpropane and trishydroxyethyl isocyanurate.

It is further essential to the invention that the free-radically crosslinkable component (KK) contains 5%-50%, preferably 10%-40%, more preferably 15%-30% by weight, based in each case on the weight of component (KK) (but of course excluding nonreactive components, such as solvents, water or additives, for example) of cyclic structural elements.

An increasing amount of cyclic structural elements in component (KK) improves the capacity of the transparent coating (KT) which has been dried but as yet not crosslinked to completion to no longer flow and to be no longer marked by any protective film that may be applied.

This is because, as the amount of cyclic structural elements in component (KK) goes up, there is an increase in the ratio of storage modulus G(MT)' to loss modulus G(MT)" at a temperature of 20° C. of the transparent coating (MT) which has been dried but as yet not crosslinked to completion.

As the amount of cyclic structural elements in component (KK) goes up there is also an increase in the chemical resistance, weathering stability and scratch resistance of the completely crosslinked transparent coating (KE). Moreover, with an excessive content of cyclic structural elements in component (KK), there is a decrease in the breaking elongation of the completely crosslinked coating (KE) and hence an increase in brittleness.

Moreover, as the amount of cyclic structural elements in component (KK) goes up, there is an increase in the storage modulus E(ME)' of the completely crosslinked transparent coating (ME) in the rubber-elastic range.

It is preferred for the free-radically crosslinkable component (KK) to comprise, as cyclic structural elements, monocyclic structural elements having 4 to 8, more preferably 5 to 6, ring members, and/or polycyclic structural elements having 7 to 18 ring members, more preferably dicyclic and/or tricyclic structural elements having preferably 10 to 12, very preferably tricyclodecane rings, and/or for the cyclic structural elements to be substituted.

The cyclic structural units may be cycloaliphatic, heterocyclic or aromatic, and are preferably cycloaliphatic and/or heterocyclic structural units. In particular a combination of cycloaliphatic and heterocyclic structural units is used.

The heterocyclic structural units may be in the chain—as in the case where uretdiones are used, for example, —and/or may form the branching points—as in the case where isocyanurates are used, for example. The cycloaliphatic structural units may likewise be in the chain—as in the case, for example, where cycloaliphatic diols are used, such as hydrogenated bisphenol A, to synthesize the urethanes, for example—and/or may form the branching points. With particular preference, however, the heterocyclic structural units form the branching points while the cycloaliphatic structural units are in the chain.

Preferred cycloaliphatic structural elements are unsubstituted or substituted cyclopentane rings, unsubstituted or substituted cyclohexane rings, unsubstituted or substituted dicycloheptane rings, unsubstituted or substituted dicyclooctane rings and/or unsubstituted or substituted dicyclodecane rings and/or unsubstituted or substituted tricyclodecane rings, especially unsubstituted or substituted tricyclodecane rings and/or unsubstituted or substituted cyclohexane rings.

The heterocyclic structural units may be saturated, unsaturated or aromatic. It is preferred to use saturated heterocyclic structural units.

The heteroatoms are preferably selected from the group nitrogen and/or oxygen and/or sulfur and/or phosphorus and/or silicon and/or boron, more preferably nitrogen. The number of heteroatoms per ring is usually 1 to 18, preferably 2 to 8 and more preferably 3.

Heterocyclic structural units used with particular preference are isocyanurate rings and/or uretdiones and/or unsubstituted or substituted triazine rings, especially isocyanurate rings.

Also suitable in principle for introducing the cyclic structural elements are aromatic structural elements, in which case the amount of aromatic structural elements is preferably not more than 10%, more preferably not more than 5% and very preferably not more than 2% by weight, based in each case on the weight of component (KK). This is because aromatic structural elements generally have adverse effects on the weathering stability of the resultant transparent coating (KE) crosslinked to completion, and so the amount of the aromatic structural elements is frequently limited for that reason.

The cyclic structural elements are introduced into the reactive component (KK) through the use of corresponding compounds having cyclic structural elements for preparing component (KK). Component (KK) can be prepared using, in particular, di- and/or polyisocyanates having cyclic structural elements and/or di- and/or polyols, di- and/or polyamines, and/or di- and/or polythiols having cyclic structural elements. Particular preference is given to using diols and/or polyols and/or diisocyanates and/or polyisocyanates having cyclic structural elements.

For preparing the oligo- and/or poly-urethane (meth)acrylates used in the free-radically crosslinkable component (KK) it is therefore preferred to make at least proportional use, as isocyanate component, of isocyanurates of di- and/or polyisocyanates, which are commonly employed in the coatings industry. Instead of or together with these isocyanurates it is possible to use prepolymers and/or adducts, especially biurets and/or allophanates and/or uretdiones, of di- and/or polyisocyanates, which are commonly used in the coatings industry. Particular preference is given to using isocyanurates and/or biurets and/or allophanates and/or uretdiones of aliphatic and/or cycloaliphatic isocyanates. In addition it is also possible to use cycloaliphatic di- and/or polyisocyanates alone or in combination with the above-recited isocyanurates and/or biurets and/or allophanates and/or uretdiones.

Examples of (cyclo)aliphatic di- and/or polyisocyanates which are commonly used in the coatings industry include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)cyclohexane, or mixtures of these polyisocyanates.

Also suitable, furthermore, are isocyanates containing aromatic structural elements in which, however, at least some of the isocyanate groups are attached to aliphatic and/or cycloaliphatic radicals, especially 1,3-bis(2-isocyanatoprop-2-yl)benzene (TMXDI).

For preparing the oligo- and/or poly-urethane (meth)acrylates used in the free-radically crosslinkable component (KK) it is particularly preferred to make at least proportional use of the isocyanurate of (cyclo)aliphatic isocyanates, especially the isocyanurate of isophorone diisocyanate and/or hexamethylene diisocyanate. Very particular preference is given to a mixture of the isocyanurate of isophorone diisocyanate and/or the isocyanurate of hexamethylene diisocyanate and/or the biuret of hexamethylene diisocyanurate and/or 1,3-bis(isocyanatomethyl)cyclohexane and/or dicyclohexylmethane 4,4'-diisocyanate.

Further of suitability are the higher polyfunctional polyisocyanates described in EP-B-1 144 476 on page 4 line 43 to page 5 line 31 and based on isocyanurates (a2.1 therein), uretdiones (a2.2 therein), biurets (a2.3 therein), polyisocyanates containing urethane and/or allophanate groups (a2.4 therein), polyisocyanates containing oxadiazinetrione groups (a2.6 therein), and carbodiimide- or uretonimine-modified polyisocyanates (a.2.7 therein).

For preparing the oligomers and/or polymers used in the free-radically crosslinkable component (KK), especially the oligo- and/or poly-urethane (meth)acrylates, preference is also given to making at least proportional use of cycloaliphatic diols and/or polyols and/or cycloaliphatic diamines and/or polyamines, especially cycloaliphatic diols, such as cyclohexanedimethanol, 1,2-, 1,3- or 1,4-cyclohexanediol, cyclooctanediol, hydrogenated bisphenol A, hydrogenated bisphenol F and tricyclodecanedimethanol, for example.

Particular preference, for preparing the oligomers and/or polymers used in the free-radically crosslinkable component (KK), especially the oligo- and/or poly-urethane (meth)acrylates, is given to using hydrogenated bisphenol A.

As already mentioned, cyclic structural elements can also be introduced by the use of aromatic structural elements—for example, via the proportional use of aromatic isocyanates or trimers and/or prepolymers and/or adducts of aromatic isocyanates, such as of 1,2-1,3- and 1,4-benzene diisocyanate, 2,4- and 2,6-tolylene diisocyanate, 4,4'-biphenylene diisocyanate, bis(4-isocyanatophenyl)methane, 2,2-bis(4-isocyanatophenyl)propane and the positionally isomeric naphthalene diisocyanates, especially the technical mixtures of 2,4- and 2,6-tolylene diisocyanate, for example. Further examples of suitable aromatic structural units are triazine rings.

These structural units may be introduced, for example, via the use of tris(alkoxycarbonylamino)triazines in accordance with U.S. Pat. No. 4,939,213, U.S. Pat. No. 5,084,541 and EP-A-624 577. Derivatives of the aforementioned compounds can also be employed.

It is essential to the invention, moreover, that the free-radically crosslinkable component (KK) comprises at least one aliphatic structural element having at least 6 carbon atoms, preferably having 6 to 18 carbon atoms, more preferably having 6 carbon atoms, in the chain.

These structural elements have a flexibilizing effect on component (KK). The greater, therefore, the amount of aliphatic structural elements having at least 6 carbon atoms in the chain, the lower the ratio of storage modulus $G(MT)'$ to loss modulus $G(MT)''$ at a temperature of 20° C. of the transparent coating (MT) which has been dried but as yet not crosslinked to completion. As the amount of aliphatic structural elements having at least 6 carbon atoms in the chain in component (KK) goes up, therefore, there is a deterioration in the capacity of the transparent coating (KT) which has been dried but is not yet crosslinked to completion to no longer flow and to no longer be marked by any protective film that may be applied.

Moreover, the lower the amount of aliphatic structural elements having at least 6 carbon atoms in the chain, the better the chemical resistance of the transparent coating crosslinked to completion.

Furthermore, the higher the amount of aliphatic structural elements having at least 6 carbon atoms in the chain, the lower the storage modulus $E(ME)'$ of the completely crosslinked transparent coating (ME) in the rubber-elastic range.

The free-radically crosslinkable component (KK) contains preferably 3%-30%, more preferably 5%-25% and very preferably 8%-20% by weight, based in each case on the weight of component (KK) (but of course excluding nonreactive components, such as solvents, water or additives, for example), of aliphatic structural elements having at least 6 carbon atoms in the chain.

Suitability for introduction into component (KK) is possessed by all relatively long hydrocarbon chains.

The introduction of this aliphatic structural element having at least 6 carbon atoms in the chain into the reactive component (KK) takes place through the use of corresponding compounds containing this aliphatic structural element having at least 6 carbon atoms in the chain for preparing component (KK). For preparing the urethane (meth)acrylates use may be made in particular of di- and/or polyisocyanates and/or chain extenders (diols and/or polyols, diamines and/or polyamines, dithiols and/or polythiols, dicarboxylic and/or polycarboxylic acids, etc.) containing this aliphatic structural element having at least 6 carbon atoms in the chain. Particular preference is given to using diols and/or polyols and/or dicarboxylic and/or polycarboxylic acids and/or diisocyanates and/or polyisocyanates containing this aliphatic structural element having at least 6 carbon atoms in the chain.

Suitability is possessed, for example, by dimeric and/or trimeric fatty acids for modifying the di- and/or polyisocyanate.

With particular preference this aliphatic structural element having at least 6 carbon atoms in the chain is introduced into the free-radically crosslinkable component (KK) through the use of correspondingly functionalized derivatives of hexamethylene, in particular through the use of compounds based on hexamethylene and additionally containing at least 1, preferably at least 2, isocyanate group(s) or OH and/or NH and/or SH group(s), in the preparation of the oligo- and/or polyurethane (meth)acrylates.

Examples of compounds which can be employed include hexamethylene diisocyanate and/or isocyanate-functional trimers and/or polymers and/or isocyanate-functional adducts of hexamethylene diisocyanate, especially the biuret and/or the isocyanurate of hexamethylene diisocyanate. Further possibilities for use include hexamethylenediol and/or hexamethylenediamine or similar compounds. A further possibility, finally, is the use of compounds which besides at least 1 ethylenically unsaturated double bond and at least 1 reactive group which is reactive toward isocyanate groups or OH groups or NH groups also contains said aliphatic structural element having at least 6 carbon atoms in the chain, such as hydroxyhexyl acrylate, for example.

Correspondingly the polyether (meth)acrylates and the polyester (meth)acrylates can also be flexibilized, for example, by reacting corresponding OH-functional prepolymers and/or oligomers (based on polyether or polyester) with relatively long-chain aliphatic dicarboxylic acids, especially aliphatic dicarboxylic acids having at least 6 carbon atoms, such as adipic acid, sebacic acid, dodecanedioic acid and/or dimer fatty acids, for example. This flexibilizing reaction can be carried out before or after the addition reaction of acrylic and/or methacrylic acid with the oligomers and/or prepolymers.

Flexibilization of the epoxy (meth)acrylates is possible in a similar way, for example, by reacting corresponding epoxy-functional prepolymers and/or oligomers with relatively long-chain aliphatic dicarboxylic acids, especially aliphatic dicarboxylic acids having at least 6 carbon atoms, such as adipic acid, sebacic acid, dodecanedioic acid and/or dimer fatty acids, for example. This flexibilization reaction can be carried out before or after the addition reaction of acrylic and/or methacrylic acid with the oligomers and/or prepolymers.

As set out above, the flexibilization of the polyether (meth) acrylates and/or of the polyester (meth)acrylates and/or of the epoxy (meth)acrylates, in other words an increase in amount of aliphatic structural elements having at least 6 carbon atoms in the chain, results in a deterioration in the capacity of the transparent coating (KT) which has been dried but as yet not crosslinked to completion to no longer flow and to no longer be marked by any protective film that may be applied.

Moreover, the lower the amount of aliphatic structural elements having at least 6 carbon atoms in the chain, the better the chemical resistance of the completely crosslinked transparent coating.

Furthermore, the higher the amount of aliphatic structural elements having at least 6 carbon atoms in the chain, the lower the storage modulus E(ME)' of the completely crosslinked transparent coating (ME) in the rubber-elastic range.

Besides these parameters already listed, the viscoelastic variables both of the coating (MT) as yet not crosslinked to completion and of the completely crosslinked coating (ME) are influenced by the amount of hydrogen bond forming structural elements in the free-radically crosslinkable component (KK). It is therefore essential for the present invention that the free-radically crosslinkable component (KK) contains hydrogen bond forming structural elements in an amount such that 1. a transparent coating (MT) produced from the mixture (M) but as yet not crosslinked to completion has a ratio of storage modulus G(MT)' to loss modulus G(MT)" of from 5 to 200, preferably from 8 to 100, more preferably from 10 to 80, G(MT)' and G(MT)" having been measured at a temperature of 20° C. by rheological oscillation measurements using a plate/plate measuring system with a heating rate of 2° C. per minute and a circular frequency of $10 \text{ s}^{-1}$, and 2. a transparent coating (ME) produced from the mixture (M) and crosslinked to completion has a storage modulus E(ME)' of from $1.0*10^{7.0}$ to $8.0*10^{7.0}$ Pa, preferably from $1.5*10^{7.0}$ to $4.5*10^{7.0}$ Pa, more preferably from $1.9*10^{7.0}$ to $3.7*10^{7.0}$ Pa, E(ME)' having been measured in the rubber-elastic range on free, completely crosslinked films having a layer thickness of 40 μm+/−10 μm by means of dynamic mechanical thermoanalysis with a heating rate of 2° C. per minute and a frequency of 1 Hz.

The higher the amount of hydrogen bond forming structural elements, the higher the ratio of storage modulus G(MT)' to loss modulus G(MT)" at a temperature of 20° C. of the transparent coating (MT) which has been dried but as yet not crosslinked to completion.

The higher the amount of hydrogen bond forming structural elements, therefore, the less the extent to which the clearcoat film which has been dried but as yet not crosslinked to completion is marked by any protective film that may be applied.

The higher the amount of hydrogen bond forming structural elements, therefore, the lower too is the tendency of the clearcoat film which has been dried but as yet not crosslinked to completion to flow.

The higher the amount of hydrogen bond forming structural elements, the higher as well the storage modulus E(ME)' of the completely crosslinked transparent coating (ME) in the rubber-elastic range.

Only through the measurement of the viscoelastic properties by means of rheological measurements in the case of the coating (MT) as yet not crosslinked to completion or by means of dynamic mechanical thermal analysis (also called DMTA for short below) on free films in the case of the completely crosslinked coating (ME) is, therefore, a universal, representative selection criterion available for the provision of coating compositions, with which moldings in their sheet-side appearance having the desired properties are obtained.

Should the viscoelastic properties, in contrast, not have the required values, this value can be set by varying the amount of hydrogen bond forming structural elements.

It is indeed the case, as already stated, that besides the amount of hydrogen bond forming structural elements the other variables of the reactive component (KK) (such as double bond content, molecular weight, number of branching points, number of cyclic structural elements, etc.) also affect the viscoelastic properties in a way indicated in the discussion of each of the individual parameters. Through the stated ranges of values for these parameters it is possible to adjust the viscoelastic properties to the values according to the invention by specifically varying the amount of hydrogen bond forming structural elements.

Thus the skilled worker is able to compensate the reduction in the storage modulus E(ME)' that is brought about in the case of a lowering, for example, in the double bond content per 1000 g of reactive component by correspondingly increasing the amount of hydrogen bond forming structural elements. An increase in the storage modulus E(ME)'—as a result, for example, of an increase in the fraction of cyclic structural elements—can also be compensated by the skilled worker by correspondingly lowering the amount of hydrogen bond forming structural elements. Correspondingly this applies in each case to a change in the other physical parameters as well. What is essential to the invention—as has already been stated a number of times—is that the storage modulus E(ME)' and also the ratio of storage modulus G(MT)' to loss modulus G(MT)" each have values within the claimed range.

Particularly suitable hydrogen bond forming structural elements here include urethane groups, allophanate groups, biuret groups, urea groups, carbamate groups, carbonate groups, hydroxyl groups, amide groups, carboxyl groups, ether groups, ester groups, and ionic or ion-forming groups.

Particular preference is given to hydrogen bond forming structural elements which function both as donor and as acceptor. In particular, therefore, the hydrogen bond forming structures are selected from the group consisting of urethane groups, allophanate groups, biuret groups, urea groups, carbamate groups and amide groups. With very particular preference the amount of hydrogen bond forming structural elements is adjusted via the nature and amount of the isocyanate adducts and/or isocyanate prepolymers used. There will therefore be an increase in the proportion of hydrogen bond forming structural elements, with very particular preference, as a result of an increase in the amount of biuret and/or allophanate used and/or in the urethane group content. Also of advantage is the additional incorporation of carbamate groups and/or amide groups and/or urea groups to the urethane groups.

The crosslinkable coating composition (K) contains preferably from 30.0% to 99.9%, more preferably from 34.0% to 69.9% and very preferably from 38.8% to 59.5% by weight, based in each case on the overall weight of the coating composition (K), of component (KK).

The crosslinkable coating compositions (K) preferably comprise at least one initiator of chemical crosslinking. These initiators are preferably photoinitiators. The photoinitiator or photoinitiators is or are preferably selected from the group consisting of unimolecular (type I) and bimolecular (type II) photoinitiators. More preferably the photoinitiators of type I are selected from the group consisting of benzophenones in combination with tertiary amines, alkylbenzophenones, 4,4'-bis(dimethylamino)benzophenone (Michler's ketone), anthrone and halogenated benzophenones and the photoinitiators of type II are selected from the group consisting of benzoins, benzoin derivatives, especially benzoin ethers, benzil ketals, acylphosphine oxides, especially 2,4,6-trimethylbenzoyldiphenylphosphine oxide and ethyl 2,4,6-trimethylbenzoylphenylphosphinate, bisacylphosphine oxides, phenylglyoxylic esters, camphorquinone, alpha-aminoalkylphenones, alpha,alpha-dialkoxyacetophenones and alpha-hydroxyalkylphenones.

If the crosslinking of the coating compositions is completed exclusively or additionally by thermal means then they preferably include C—C-cleaving initiators, preferably benzpinacols. Examples of suitable benzpinacols are benzpinacol silyl ethers or the substituted and unsubstituted benzpinacols as described in U.S. Pat. No. 4,288,527 A in column 3 lines 5 to 44 and WO02/16461, page 8 line 1 to page 9 line 15. Preference is given to using benzpinacol silyl ethers, particularly mixtures of monomeric and oligomeric benzpinacol silyl ethers.

The amount of the initiators in the crosslinkable coating compositions (K) can vary widely and is guided by the requirements of the case in hand and by the performance properties which it is intended the coatings (KE) produced therefrom should have. The amount is preferably from 0.1% to 10%, in particular from 1.0% to 7.0% by weight, based in each case on the solids of the coating composition (K).

Furthermore it is possible for the crosslinkable coating compositions (K) to comprise conventional additives in effective amounts. Normally the amount of these additives is between 0% and 10% by weight, preferably between 0.2% and 5.0% by weight, based in each case on the solids of the coating composition (K). They are preferably selected from the group consisting of light stabilizers, such as UV absorbers and reversible free-radical scavengers (HALS); antioxidants; wetting agents; emulsifiers; slip additives; polymerization inhibitors; adhesion promoters; leveling agents; film-forming auxiliaries; rheological assistants; flame retardants; corrosion inhibitors which are not pigments; free-flow aids; waxes; siccatives; biocides; and flatting agents.

Examples of suitable additives are described in detail in the textbook "Lackadditive" [Additives for coatings] by Johan Bieleman, Wiley-VCH, Weinheim, N.Y., 1998, in D. Stoye and W. Freitag (Editors), in German patent application DE 199 14 896 A 1, column 14 line 26 to column 15 line 46, or in German patent application DE 199 08 018 A 1, page 9 line 31 to page 8 line 30.

The crosslinkable coating compositions (K) generally further comprise conventional solvents and/or water, but may also be formulated substantially or entirely free from solvent and substantially or entirely free from water, as what are called 100% systems. If the coating compositions (K) include solvents, they contain preferably from 20% to 70%, more preferably from 30% to 64.5% and very preferably from 40% to 60% by weight, based in each case on the overall weight of the coating composition (K), of one or more solvents and/or water, preferably of one or more organic solvents.

Suitable solvents are all those commonly used in clearcoat materials, especially alcohols, glycol ethers, esters, ether esters and ketones, aliphatic and/or aromatic hydrocarbons, such as acetone, methyl isobutyl ketone, methyl ethyl ketone, butyl acetate, 3-butoxy-2-propanol, ethyl ethoxypropionate, butylglycol, dipropylene glycol methyl ether, butyl glycolate, Shellsol® T, pine oil 90/95, Solventnaphtha®, Shellsol® A, petroleum spirit 135/180 and the like, for example.

The crosslinkable coating composition (K) preferably contains less than 20%, in particular less than 10%, more preferably less than 5% by weight, based in each case on the weight of component (KK), and with very particular preference none at all, of polymeric saturated constituent (KS), especially no thermoplastic polymers.

In terms of its method the preparation of the coating compositions (K) has no particular features but instead takes place by the mixing and homogenizing of the above-described constituents using conventional mixing techniques and apparatus such as stirred tanks, agitator mills, kneaders, Ultraturrax, inline dissolvers, static mixers, toothed-wheel dispersers, pressure relief nozzles and/or microfluidizers, preferably in the absence of actinic radiation.

The transparent coating composition is normally applied in an amount such as to result in a dry film thickness of at least 30 µm, preferably a dry film thickness of from 30 to 160 µm, more preferably from 40 to 80 µm.

Pigmented Coating Composition (P)

As pigmented coating composition (P) use is made of pigmented coating compositions (P) which in general are curable physically or thermally and/or with actinic radiation. The system may be what is called a 100% system, being substantially or entirely free from water and organic solvents. Preferably, however, the coating compositions used are aqueous or conventional—that is, including organic solvents.

The pigmented coating compositions (P) employed normally comprise (I) one or more solvents and/or water,
(II) one or more binders, preferably one or more polyurethane resins and/or acrylate resins, more preferably a mixture of at least one polyurethane resin and at least one acrylate resin,
(III) optionally at least one crosslinking agent,
(IV) one or more pigments, and
(V) optionally one or more customary auxiliaries and additives.

It is preferred to use the customary and known, physically and/or thermally curable, conventional or aqueous basecoat materials (P) such as are known, for example, from WO 03/016095 A 1, page 10 line 15 to page 14 line 22, or in particular from U.S. Pat. No. 5,030,514, column 2 line 63 to column 6 line 68 and column 8 line 53 to column 9 line 10, and also EP-B-754 740, column 3 line 37 to column 6 line 18.

Very particular preference is given to using thermally curable aqueous basecoat materials (P).

Suitable binders are the polyurethane resins and acrylate resins commonly used in basecoat materials in the field of the automobile industry, the flexibility of the binders, in particular, and hence their suitability for the process of the invention, being controlled, in a manner known to the skilled worker, via the selection of the nature and amount of the building block components used for preparing these binders. For details reference may again be made, for example, to U.S. Pat. No. 5,030,514, column 2 line 63 to column 6 line 68 and column 8 line 53 to column 9 line 10.

Additionally the pigmented coating compositions preferably comprise, as crosslinking agent, at least one additional amino resin. Suitability is possessed in principle by the amino resins usually used in the field of the coatings industry, the properties of the pigmented coating compositions being controllable via the reactivity of the amino resins.

The amount of binder and, where appropriate, amino resin in the pigmented coating composition can vary widely and is usually from 0% to 70%, preferably from 10% to 60%, by weight of polyurethane resin, from 0% to 70%, preferably from 10% to 60%, by weight of acrylate resin, and from 0% to 45%, preferably from 5% to 40%, by weight of amino resin, based in each case on the overall amount of binder plus amino resin.

Based on the overall weight of the pigmented coating composition (P) the fraction of binder plus, where appropriate, amino resin is usually from 10% to 50% by weight.

The pigmented coating composition (P) further comprises at least one pigment. The pigment is preferably selected from the group consisting of organic and inorganic, color, effect, color and effect, magnetically shielding, electrically conductive, anticorrosion, fluorescent and phosphorescent pigments. It is preferred to use the color and/or effect pigments.

Examples of suitable effect pigments, which may also impart color, are metal flake pigments, such as commercial aluminum bronzes, aluminum bronzes chromated in accordance with DE 36 36 183 A 1, and commercial stainless steel bronzes, and also nonmetallic effect pigments, such as pearlescent pigments and interference pigments, platelet-shaped effect pigments based on iron oxide or liquid-crystalline effect pigments, for example. For further details refer to Römpp Lexikon Lacke und Druckfarben, Georg Thieme Verlag, 1998, page 176, "Effect pigments" and pages 380 and 381 "metal oxide-mica pigments" to "metal pigments".

Suitable organic and/or inorganic color pigments are the pigments normally used in the coatings industry.

The amount of the pigments in the coating composition (P) can vary very widely and is guided primarily by the depth of the color and/or the intensity of the effect which are to be brought about, and also by the dispersibility of the pigments in the coating compositions (P). Preferably the pigment content, based in each case on the coating composition (P), is from 0.5% to 50%, preferably from 1% to 30%, more preferably from 2% to 20% and in particular from 2.5% to 10% by weight.

Besides the above-described pigments the coating composition (P) may comprise conventional auxiliaries and additives, such as organic and inorganic, transparent and opaque fillers and nanoparticles, and also further customary auxiliaries and additives, in customary amounts, preferably from 0% to 40% by weight, based on the coating composition (P).

The pigmented coating composition (P) is normally applied in amounts such as to result in a dry film thickness of at least 30 µm, preferably a dry film thickness of from 30 to 160 µm, more preferably from 50 to 150 µm.

Thermoplastic Support Sheet (T)

The thermoplastic support sheet (T) may be in single-layer form or may comprise at least one further layer.

For instance, on its side (T2) facing away from the subsequent coating (B), (T) may comprise at least one adhesion promoter layer (HS). Preferably, however, the side (T2) of the support sheet is joined directly to the polymeric material (KM), without an interlayer.

Located between the surface (T1) and the subsequent coating (B) it is also possible for there to be at least one, especially one, interlayer (ZS), such as surfacer layer (FS) and/or adhesion promoter layer (HS), for example. Between the surface (T1) and the adhesion promoter layer (HS) and/or between the adhesion promoter layer (HS) and the coating (B) in this case there may be at least one, especially one, transition layer (US). Preferably, however, the coating (B) is disposed directly, i.e. without interlayer, on the surface (T1).

The support sheet (T) is composed essentially or entirely of at least one thermoplastic polymer. The thermoplastic polymer is preferably selected from the group consisting of conventional and known homopolymers and copolymers of linear, branched, star-shaped, comb and/or block construction. The homopolymers and copolymers are preferably selected from the group consisting of polyurethanes, polyesters, especially polyethylene terephthalates and polybutylene terephthalates, polyethers, polyolefins, polyamides, polycarbonates, polyvinyl chlorides, polyvinylidene fluorides, poly (meth)acrylates, especially polymethyl methacrylates and polybutyl methacrylates, and impact-modified polymethyl methacrylates, polystyrenes, especially impact-modified polystyrenes, more particularly acrylonitrile-butadiene-styrene copolymers (ABS), acrylic-styrene-acrylonitrile copolymers (ASA) and acrylonitrile-ethylene-propylene-diene-styrene copolymers (A-EPDM); polyetherimides, polyetherketones, polyphenylene sulfides, polyphenylene ethers, and blends of these polymers.

By ASA are meant, in general, impact-modified styrene/acrylonitrile polymers, in which graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular advantage use is made of ASA, polycarbonates, blends of ASA and polycarbonates, polypropylene, polymethyl methacrylates or impact-modified polymethyl methacrylates, especially blends of ASA and polycarbonates, preferably with a polycarbonate fraction >40%, in particular >50%.

Materials used with preference for the support sheet (T) are also, in particular, the thermoplastic polymers described in DE-A-101 13 273 on page 2 line 61 to page 3 line 26.

The homopolymers and copolymers may comprise the additives conventional within the field of thermoplastics. They may further comprise conventional fillers, including reinforcing fillers, and fibers. Not least they may also comprise the pigments, including effect pigments, and/or conventional dyes, and so allow the shade of the support sheets to be matched to the shade of the coating obtained from the pigmented coating compositions (P).

The layer thickness of the support sheet (T) is usually more than 0.5 mm, preferably between 0.7 and 2.0 mm and more preferably between 0.9 and 1.2 mm.

As transition layers (US) it is possible to use conventional layers, with a thickness of preferably from 1 to 50 µm, of thermoplastic materials, in particular of the thermoplastic polymers described above.

The adhesion promoter layer is used when adhesion between the support sheet (T) and the polymeric material (KM) is inadequate: for example, if polyolefins are employed for (T) or (KM). As adhesion promoter layer (HS) it is possible to use layers of customary adhesion promoters with a thickness of from 1 to 100 µm preferably, these layers being conventional and as described, for example, in DE-A-101 13 273 on page 4 lines 27 to 29.

Polymeric Material (KM)

The liquid or softened polymeric material (KM) preferably comprises at least one melted or softened, thermoplastic polymer, in particular at least one of the thermoplastic polymers described above in connection with the support sheet (T), or consists thereof.

It is preferred to use polymeric materials which comprise fibers, the terms "fibers" also including platelet-shaped products. Examples of suitable fibers are carbon, aramid, steel or glass fibers and aluminum flakes, preferably glass fibers.

Also suitable, for example, are the polymeric materials described in DE-A-101 13 273 on page 4 line 44 to page 5 line 45. The version of the process in which a melted or softened thermoplastic polymer of this kind is used is also referred to as backing by injection molding or by compression molding.

Alternatively the liquid or softened polymeric material may comprise a conventional reactive mixture which forms the solid polymeric material (KM) in the shaping mold or backing mold. In this case the polymeric material (KM) may likewise comprise the additives described above in connection with the support sheet (T). It is also possible, furthermore, to use polymeric materials (KM) which include pore-forming blowing agents. Examples of suitable reactive mixtures are the known reactive mixtures that are normally used in foam backing processes, especially polyurethane foams, examples being the reactive mixtures described in EP-B-995 667, especially in EP-B-995 667, column 2 line 40 to column 3 line 14; column 5 lines 23 to 29; and column 8 lines 33 to 38.

The version of the process in which a reactive mixture of this kind or mixture (KM) including blowing agent is used is also referred to as foam backing by reaction-injection molding, RIM.

Protective Film (S)

Suitable protective films (S) are all commonly used protective films, which may be in single-layer or multilayer form. Use is made in particular of the protective films described in DE-A-10335620, page 17 line 20 to page 19 line 22.

Particularly suitable protective films (S) are those based on homopolymers and copolymers of polyethylene, polypropylene, ethylene copolymers, propylene copolymers, and ethylene-propylene copolymers.

The protective film is preferably selected such that with a layer thickness of 50 µm it has a transmittance >70% for UV radiation and visible light with a wavelength of from 230 to 600 nm.

Additionally it is preferred to use protective films which in the temperature range from room temperature to 100° C. have a storage modulus E' of at least $10^7$ Pa and also have a breaking elongation >300% at 23° C. both longitudinally and transversely to the preferential direction generated during the production of the protective film by means of directed production methods. With particular preference the side of the protective film that faces the coating (B) additionally has a hardness <0.06 GPa at 23° C. and a roughness as determined by atomic force microscopy (AFM) corresponding to an $R_a$ value from 50 µm² <30 nm.

With very particular preference the protective films (S) are from 10 to 100 µm, in particular from 30 to 70 µm, thick.

The protective films (S) for use in accordance with the invention are conventional and are sold, for example, by Bischof+Klein, D-49525 Lengerich, under the designations GH-X 527, GH-X 529 and GH-X-535.

Process for Producing Moldings

Process Step I

The pigmented coating composition (P) can be applied in one layer or in two or more layers to the thermoplastic support sheet.

If the pigmented coating composition (P) is applied in only one layer then this is done preferably by means of a nondirected application method, which does not bring about an arrangement of the pigments in a preferential direction in the resultant pigmented coatings. In other words, the pigments are distributed isotropically in the coating. Examples of suitable nondirected application methods and apparatus therefor are known from WO 03/016095 A 1, page 20 line 4 to page 23 line 25. Pneumatic or electrostatic spraying apparatus is used in particular, as described in WO 03/016095 A 1, page 20 line 4 to page 23 line 25.

If the pigmented coating composition (P) is applied in two or more layers then this is preferably done such that the first layer or, where there are more than 2 pigmented layers in total, the first layers is or are applied by means of a directed application method which brings about an arrangement of the pigments in a preferential direction, i.e. an anisotropic distribution of the pigments, in the resultant pigmented coating. Examples of suitable directed application methods are known from WO 03/016095 A 1, page 15 lines 6 to 19. Knife coaters, casting apparatus and rollers are used in particular. The last pigmented layer is then applied by means of the above-described nondirected application method.

The coating composition (K) may likewise be applied in one or more layers, preferably in one layer, by means of the above-described directed and nondirected application methods. Preferably the coating composition (K) is applied by directed application methods, very preferably using cast-film extruders. The coating compositions (K) are preferably applied and processed further in the absence of actinic radiation.

In general, moreover, in the case of multilayer application of the pigmented coating compositions (P), the most recent layer of coating is flashed off briefly, preferably at an elevated temperature, before the next layer of the pigmented coating composition is applied. Similarly, prior to the application of the coating composition (K), the pigmented coating composition (P) applied beforehand is flashed off briefly, preferably at an elevated temperature. This flashing off is commonly also referred to as conditioning.

It is essential, however, that, following its application and before process step II, the applied coating composition (K) is dried and/or partially crosslinked to give a coating (KT) as yet not crosslinked to completion.

The coating (KT) thus obtained must no longer flow or be marked by any protective film that may be applied. This ensures that moldings are obtained which in terms of their sheet-side appearance satisfy the requirements imposed on a class A surface.

For the drying or conditioning of the wet pigmented coatings and also the wet transparent coatings it is preferred to use thermal and/or convection methods, in which case conventional apparatus is employed, such as tunnel ovens, NIR and IR radiant heaters, fans and blowing tunnels. Combinations of such apparatus may also be used.

Normally the drying or conditioning of the transparent coating takes place such that the coating is flashed off at ambient temperature (generally 25° C.) for a time of from 2 to 30 minutes and then dried at elevated temperature (preferred oven temperature from 80 to 140° C.) for a time of from 5 to 30 minutes.

For a process employed with preference for applying and drying the pigmented coating compositions (P) and the coating compositions (K) reference may also be made to the as yet unpublished German patent application bearing the file reference 10 2004 010 787.4, page 16 line 4 to page 25 line 8.

With particular preference, therefore, the application and conditioning of the pigmented coating composition (P) and of the crosslinkable coating composition (K) take place such that a. the pigmented coating composition (P) is applied to the support sheet to give a wet pigmented layer 1a, which is adjusted to a residual volatiles content of x<10% by weight, based on the pigmented layer, to give a conditioned pigmented layer 1b, b. the assembly made up of support sheet and conditioned layer 1b is adjusted to a temperature of <50° C., preferably <35° C., at the surface of the layer 1b, c. if desired, a second pigmented coating composition (P) or the same pigmented coating composition (P) for a second time is applied to the conditioned and heat-treated layer 1b to give a wet pigmented layer 2a, which is adjusted to a residual volatiles content of y<10% by weight, based on the pigmented layer, to give a conditioned layer 2b, d. if desired, the assembly made up of support sheet and conditioned layers 1b and 2b is adjusted to a temperature of <50° C., preferably <35° C., at the surface of the layer 2b, e. the crosslinkable coating composition (K) is applied to the conditioned and heat-treated layer 1b or 2b to give a wet layer 3a which is adjusted to a residual volatiles content of z<5% by weight, based on the layer of the coating composition (K), to give a conditioned, deformable layer 3b curable thermally and/or with actinic radiation.

This process is performed with particular preference such that in process step a in the first drying section an average drying rate of from 10% to 40% by weight/min is employed, based on the overall amount of volatiles in the applied pigmented layer, until a residual volatiles content of x=12% to 30% by weight is achieved, based on the pigmented layer, and in the last drying section an average drying rate of from 1% to 6% by weight/min is employed, based on the overall amount of volatiles in the applied pigmented layer, until a residual volatiles content of x<10% by weight, more preferably <7% by weight, in particular <5% by weight is achieved, based in each case on the pigmented layer, and/or in process step c in the first drying section an average drying rate of from 10% to 40% by weight/min is employed, based on the overall amount of volatiles in the applied layer, until a residual volatiles content of y=12% to 30% by weight is achieved, based on the pigmented layer, and in the last drying section an average drying rate of from 1.5% to 4% by weight/min is employed, based on the overall amount of volatiles in the applied pigmented layer, until a residual volatiles content of y<10% by weight, more preferably <7% by weight, in particular <5% by weight is achieved, based in each case on the pigmented layer, and/or in process step e in the first drying section an average drying rate of from 10% to 30% by weight/min is employed, based on the overall amount of volatiles in the applied layer of coating composition (K), until a residual volatiles content of z=10% to 15% by weight is achieved, based on the layer of coating composition (K), and in the last drying section an average drying rate of from 0.5% to 3% by weight/min is employed, based on the overall amount of volatiles in the applied layer of coating composition (K), until a residual volatiles content of z<7% by weight, more preferably <5% by weight, in particular <3% by weight is achieved, based in each case on the layer of coating composition (K).

With process step e, preferably, the coating (KT) as yet not crosslinked to completion is obtained.

The assemblies made up of support sheet and pigmented layer that result in the course of the process of the invention can be wound, stored, transported and supplied to another application apparatus before the next layer in each case is applied, and can be coated with said next layer in said other application apparatus. For this purpose the assemblies may be lined with protective film, which is removed again before the next layer is applied.

Preferably, however, the process of the invention is carried out in a continuous installation which includes all of the necessary application apparatus and apparatus for conditioning. Additionally this continuous installation includes conventional apparatus for supplying the pigmented and transparent coating compositions to the application apparatus; unwinders for the support sheets and protective films, and winders for the multilayer sheets F; drives for conveying the sheets and, where appropriate, the application apparatus; suction apparatus for the volatiles; cooling fans and/or chill rolls for adjusting the surface temperature of the conditioned coating layers; measurement and control apparatus; and, where appropriate, apparatus for shielding from actinic radiation.

Process Steps II to IV

Before process step II the above-described sheet (F) produced in stage I is preferably inserted into an opened mold, in particular a thermoforming mold. For this purpose the sheet (F) can be wound from a roll and cut into suitably sized sections. After that, the sheet (F) or the cut-to-size sections can be subjected to preliminary shaping, in particular in the thermoforming mold, and in particular can be adapted to the contours of the backing molds. In process step II, these preliminarily three-dimensionally shaped sections are then inserted into a mold, in particular a backing mold. An alternative possibility is to insert the sheet (F) or cut-to-size sections of the sheet (F) directly, i.e., without preliminary three-dimensional shaping, into a mold in process step II, in particular a backing mold or shaping mold, and to carry out shaping directly in that mold.

In process step III the mold is closed and the side (T2) of the thermoplastic support sheet (T) that faces away from the surface (T1) is contacted with a liquid or softened polymeric material (KM), as a result of which the coated thermoplastic support sheet (T) is, where appropriate, shaped and firmly joined to the polymeric material (KM). Subsequently the polymeric material (KM) is solidified.

In process step IV the molding obtained in stage III is removed from the mold. It can be processed further immediately thereafter or stored until process step V is carried out.

Process steps II to IV are known to the skilled worker and also described in a multitude of references. Reference may be made here only to DE-A-101 13 273, page 5 line 47 to page 7 line 35.

Process Step V

In process step V the coating (KT) is crosslinked to completion. This takes place at any desired point in time in the course of the process. Crosslinking may also take place in two or more steps, so that—following one or more partial cures, where appropriate—complete crosslinking takes place. Where appropriate it is also possible in this process step for the pigmented coating (P) to be crosslinked or additionally crosslinked.

As already described in connection with the drying of the transparent coating (KT) it is essential to the invention that the coating (KT) is as yet not crosslinked to completion, but at the same time that (KT) has a resistance such that it no longer flows and such that it is not marked by any protective film that may be applied.

This coating (KT) as yet not crosslinked to completion can be crosslinked completely in process step (I) and/or after process step (I) and/or in process step (III) and/or after process step (IV).

The transparent coating (KT) as yet not crosslinked to completion, however, has better thermoformability than the completely crosslinked coating (KE). Preferably, therefore, the coating (KT) is crosslinked to completion following deformation, in particular after the sheet (F) has been adapted to the contour of the mold into which the sheet (F) is inserted in process step (II). Since, however, the mechanical load-bearing capacity of the transparent coating (KT) as yet not crosslinked to completion is reduced as compared with that of the completely crosslinked coating (KE), and since as high as possible a load-bearing capacity is desirable when injection backmolding, simply because of the high pressures that are normally employed, it is also preferred, in order to prevent damage to the sheet (F) and hence to ensure the required class A surface, to effect crosslinking to completion prior to injection backmolding, in other words before process step (III), and in particular before process step (II) as well, but after the thermoforming.

A further possibility is to carry out process step V at an elevated temperature, preferably at a temperature between 25 and 150° C., in particular between 40 and 120° C. and very preferably between 50 and 100° C. The elevated temperature may be attained by means of specific heating, by means for example of IR lamps, heated air or other customary apparatus. An alternative possibility, however, is to carry out process step V immediately following process step IV and so to utilize the temperature increase brought about by the injection backmolding operation.

The crosslinking of the coating composition (K) to completion takes place preferably by means of high-energy radiation, in particular by means of UV radiation. With particular preference the crosslinking to completion is carried out as described in WO 03/016095 A 1, page 27 line 19 to page 28 line 24. An alternative possibility is to carry out the crosslinking to completion thermally, exclusively or in addition to radiation curing. In that case the thermal crosslinking to completion takes place preferably during and/or immediately after process step IV, so as to utilize the temperature increase brought about by the injection backmolding operation.

Crosslinking to completion is preferably carried out using radiation with a radiation dose of from 100 to 6000, preferably from 200 to 3000, more preferably from 300 to 2500 and very preferably from 500 to 2000 mJcm$^{-2}$, the range <2000 mJcm$^{-2}$ being especially preferred.

Irradiation can be carried out under an oxygen-depleted atmosphere. "Oxygen-depleted" means that the oxygen content of the atmosphere is lower than that of air (20.95% by volume). In principle the atmosphere may also be oxygen-free: in other words, may constitute an inert gas. Owing to the lack of the inhibitory effect of oxygen, however, this may produce a sharp acceleration in radiation curing, possibly leading to inhomogeneities and stresses in the crosslinked materials of the invention. It is therefore of advantage not to lower the oxygen content of the atmosphere to zero % by volume.

Use of the Moldings

The moldings obtained by the process of the invention have an extremely broad spectrum of possible applications. For instance they can be used to outstanding effect as interior or exterior bodywork components, as components for shipbuilding and aircraft construction, as components for rail vehicles or as components for household and electrical appliances, for buildings, windows, doors, furniture and articles of everyday use of any kind. They are preferably used as interior or exterior bodywork components or modules, in particular for automobiles, trucks and buses.

Since the moldings, in their sheet-side appearance, satisfy the requirements of a class A surface and meet the requirements normally imposed on an automotive finish, they are suitable to particularly outstanding effect as exterior mounted components for automobile bodies, especially for bodies of top-class automobiles, such as, for example, for producing hardtops, tailgates, bonnets, fenders, bumpers, and the like, for example.

Example 1

The Preparation of the Organic Solution of a Urethane Acrylate (Organic Solution of Component (KK1))

A urethane acrylate was prepared from the building block components set out below by coarsely dispersing the hydrogenated bisphenol A in 2-hydroxyethyl acrylate at 60° C. with stirring. Added to this suspension were the isocyanates, hydroquinone monomethyl ether, 1,6-di-tert-butyl-para-cresol and methyl ethyl ketone. After dibutyltin dilaurate had been added the mixture heated up. Stirring was carried out at an internal temperature of 75° C. for a number of hours until there was virtually no longer any change in the NCO value of the reaction mixture. The free isocyanate groups still present where appropriate after the reaction were reacted by adding a small amount of methanol.

104.214 g of hydrogenated bisphenol A (corresponding to 0.87 equivalent of hydroxyl groups), 147.422 g (corresponding to 0.77 equivalent of isocyanate groups) of Basonat® HI 100 from BASF AG=commercial isocyanurate of hexamethylene diisocyanate with an NCO content of 21.5%-22.5% (DIN EN ISO 11909), 147.422 g (corresponding to 0.77 equivalent of isocyanate groups) of Basonat® HB 100 from BASF AG=commercial biuret of hexamethylene diisocyanate with an NCO content of 22%-23% (DIN EN ISO 11909), 124.994 g (corresponding to 0.51 equivalent of isocyanate groups) Vestanat® T1890 from Degussa=commercial isocyanurate of isophorone diisocyanate with an NCO content of 11.7%-12.3% (DIN EN ISO 11909)

131.378 g of 2-hydroxyethyl acrylate (corresponding to 1.13 equivalents of hydroxyl groups)

0.328 g of hydroquinone monomethyl ether (0.05% on solids)

0.655 g of 1,6-di-tert-butyl-para-cresol (0.1% on solids)

methyl ethyl ketone (70% solids)

0.066 g of dibutyltin dilaurate (0.01% on solids)

4.500 g of methanol (corresponding to 0.14 equivalent of hydroxyl groups)

The component (KK1) thus obtained has the following characteristics:
- on average 4.6 ethylenically unsaturated double bonds per molecule
- a double bond content of 1.74 mol of double bonds per 1000 g of urethane acrylate solids
- on average 2.2 branching points per molecule
- 25% by weight of cyclic structural elements, based on the solids content of the urethane acrylate.

Using this component (KK) the mixture (M) was prepared, in accordance with the information contained in the description, by charging 143.00 parts by weight of the above-described organic solution of component (KK), at 70% in methyl ethyl ketone, to a suitable stirred vessel.

Added to the initial charge over the course of 30 minutes was a mixture of 1.0 part by weight of Tinuvin® 292 (commercial HALS light stabilizer from Ciba Specialty Chemicals, based on a mixture of bis(1,2,2,6,6-pentamethyl-4-piperidinyl) sebacate and methyl (1,2,2,6,6-pentamethyl-4-piperidinyl)sebacate), 2.4 parts by weight of the commercially customary light stabilizer solution Tinuvin® 400 (commercial light stabilizer from Ciba Specialty Chemicals, based on a mixture of 2-(4-((2-hydroxy-3-dodecyloxypropyl)oxy)-2-hydroxyphenyl)-4,6-bis(2,4-dimethylphenyl)-1,3,5-triazine and 2-(4-((2-hydroxy-3-tridecyloxypropyl)oxy)-2-hydroxyphenyl)-4,6-bis(2,4-dimethylphenyl)-1,3,5-triazine 85% strength in 1-methoxy-2-propanol), 0.8 part by weight of Lucirin® TPO-L (commercial photoinitiator from BASF Aktiengesellschaft, based on ethyl 2,4,6-trimethylbenzoylphenylphosphinate), 2.40 parts by weight of Irgacure® 184 (commercial photoinitiator from Ciba Specialty Chemicals, based on 1-hydroxycyclohexyl phenyl ketone), used in the form of 3.0 parts of an 80% strength solution in acetone, and 0.2 part by weight of a commercially customary polyether-modified polydimethylsiloxane (used in the form of 1.7 parts of a commercially customary 12.5% strength solution of the polyether-modified polydimethylsiloxane in 7/2 xylene/monophenylglcyol Byk® 306 from Byk Chemie) at room temperature with continuous stirring and this was adjusted with 3-butoxy-2-propanol to a solids content of 48%. The resulting mixture was subsequently stirred at room temperature for 30 minutes.

For determining the ratio of storage modulus G(MT)' to loss modulus G(MT)" the mixture (M) is knife coated onto a polyethylene terephthalate film in a wet layer thickness of 200 μm using a Linecoater from Coatema GmbH, Dormagen, Germany, by means of knife coaters. The coated film then runs at a speed of 0.2 m/min into the flash-off tunnel, where it resides for 20 minutes at a temperature of 25° C. and a relative humidity of 65%. Subsequently the coated film runs into the oven for 15 minutes, where it is dried at an oven temperature of 119° C. The dried coating (MT) is subsequently scraped from the coated film using a scraper and passed on for rheological testing.

The measurements are conducted using the MCR 300 instrument from Physica (plate/plate measuring system, 25 mm diameter) with a circular frequency of $10\ s^{-1}$ and an amplitude of 0.1%. The heating rate for the rheological measurements is 2° C. per minute.

The ratio of storage modulus G(MT)' to loss modulus G(MT)" determined in this way is 66 at a temperature of 20° C.

The storage modulus E(ME)' in the rubber-elastic range is determined by applying the mixture (M) to polypropylene and crosslinking it to completion. The layer thickness of the free films used for the measurement is generally 40±10 μm. The heating rate in this case is 2° C. per minute. The measurements are conducted using the DMTA V instrument from Rheometrics Scientific, with a frequency of 1 Hz and an amplitude of 0.2%.

The storage modulus E(ME)' in the rubber-elastic range is $2.5*10^{7.0}$ Pa.

The Preparation of a UV-Curable Coating Composition (K1)

The mixture (M) described above was used directly as coating composition (K1).

The Production of a Coated Thermoplastic Support Sheet 1

The support sheet used was a thermoplastic film of Luran® S 778 TE from BASF Aktiengesellschaft, with a thickness of 800 μm. The surface of the support sheet to be coated was subjected to corona pretreatment at 0.5 kilowatt.

The film was coated on one side with a metallic aqueous basecoat material (shade: "Silver Metallic"). Using a box-type coating bar with a width of 37 cm, the basecoat material was applied to the support sheet with a belt speed of 0.5 m/min. Application was carried out with a gentle air flow of 0.2 m/s, a constant temperature of 21±1° C. and a constant relative humidity of 65±5%. The thickness of the resulting wet basecoat layer 1a was 100 μm. The wet basecoat layer 1a was flashed off under these conditions for 3 minutes and then dried, as described on page 28 lines 4 to 23 of the as yet unpublished German patent application bearing the file reference 10 2004 010 787.4, to a residual volatiles content of x=4% by weight, based on the basecoat layer. The resulting conditioned basecoat layer 1 b, with a thickness of about 20 μm, was adjusted using chill rolls to a surface temperature <30° C.

The same basecoat material was applied to the conditioned and heat-treated basecoat layer 1 b under the following conditions, using a system for pneumatic spray application:
  outflow rate: 100 ml/min;
  air pressures: atomizer air: 2.5 bar; horn air: 2.5 bar;
  speed of movement of the nozzles: high enough to result in 60% overlapping of the spray jets;

nozzle—film distance: 30 cm.

Application was carried out with a gentle air flow of 0.5 m/s (vertical flow impingement on the film), a constant temperature of 21±1° C. and a constant relative humidity of 65±5%. The thickness of the resulting wet basecoat layer 2a was 50±2 μm. The basecoat layer 2a was flashed off under these conditions for 3 minutes and then dried, as described on page 29 lines 12 to 30 of the as yet unpublished German patent application bearing the file reference 10 2004 010 787.4, to a residual volatiles content of y=4% by weight, based on the basecoat layer. The air temperature here was 90° C., the atmospheric humidity 10 g/min, and the air speeds 10 m/s. The resulting conditioned basecoat layer 2b, with a thickness of about 10 μm, was adjusted using chill rolls to a surface temperature <30° C.

Using a box-type coating bar with a width of 37 cm, the above-described coating composition (K) was applied to the conditioned and heat-treated basecoat layer 2b. Application was carried out with a gentle air flow of 0.2 m/s, a constant temperature of 21±1° C. and a constant relative humidity of 65±5%. The thickness of the resulting wet clearcoat layer 3a was 120 μm. It was flashed off under the stated conditions for 6 minutes and then dried, as described on page 30 lines 10 to 29 of the as yet unpublished German patent application bearing the file reference 10 2004 010 787.4, to a residual volatiles content of z=2.5% by weight, based on the clearcoat layer. The air temperature in the oven was 119° C. for all drying stages. The resulting coating (KT), dried but as yet not crosslinked to completion, and with a thickness of 60 μm, was adjusted using chill rolls to a surface temperature <30° C. and coated with the polypropylene protective film described in DE-A-10335620, Example 1 (commercial product GH-X 527 from Bischof+Klein, Lengerich, Germany).

The resultant multilayer sheet (F) was wound to a roll and stored in that form prior to its further use.

The Production of Polymer Moldings

The multilayer sheet (F) was preformed. Subsequently the transparent coating as yet not crosslinked to completion was partially crosslinked with UV radiation through the protective film. The positive tool used was a cube. The resulting preformed part was inserted into an injection mold. The mold was closed and the cube was injection backmolded with a liquid polymeric material. The resultant polymer molding was cooled and removed from the mold. Subsequently the partially crosslinked transparent coating was crosslinked to completion with UV radiation. Thereafter the protective film was removed.

The polymer moldings produced in this way had a high-gloss surface which was free from defects.

Example 2

The Preparation of the Organic Solution of a Urethane Acrylate (Organic Solution of Component (KK2))

A urethane acrylate was prepared from the building block components set out below by coarsely dispersing the hydrogenated bisphenol A in 4-hydroxybutyl acrylate and pentaerythritol tri/tetraacrylate at 60° C. with stirring. Added to this suspension were the isocyanates, hydroquinone monomethyl ether, 1,6-di-tert-butyl-para-cresol and butyl acetate. After dibutyltin dilaurate had been added the mixture heated up. Stirring was carried out at an internal temperature of 75° C. for a number of hours until there was virtually no longer any change in the NCO value of the reaction mixture. The free isocyanate groups still present where appropriate after the reaction were reacted by adding a small amount of methanol.

227.7 g of hydrogenated bisphenol A (corresponding to 1.89 equivalents of hydroxyl groups),
178.2 g of 4-hydroxybutyl acrylate (corresponding to 1.24 equivalents of hydroxyl groups)
701.3 g of pentaerythritol tri/tetraacrylate (OH number=110 mg(KOH)/g, corresponding to 1.37 equivalents of hydroxyl groups)
325.69 g (corresponding to 1.71 equivalents of isocyanate groups) of Basonat® HI 100 from BASF AG=commercial isocyanurate of hexamethylene diisocyanate with an NCO content of 21.5%-22.5% (DIN EN ISO 11909),
325.69 g (corresponding to 1.74 equivalents of isocyanate groups) of Basonat® HB 100 from BASF AG=commercial biuret of hexamethylene diisocyanate with an NCO content of 22%-23% (DIN EN ISO 11909),
147.38 g (corresponding to 1.13 equivalents of isocyanate groups) of Desmodur® W from Bayer MaterialScience AG=commercial dicyclohexylmethane diisocyanate with an NCO content of >31.8%
0.953 g of hydroquinone monomethyl ether (0.05% on solids)
1.906 g of 1,6-di-tert-butyl-para-cresol (0.1% on solids)
816.84 g of butyl acetate (corresponds to 70% solids)
0.7624 g of dibutyltin dilaurate (0.04% on solids)
17.1 g of methanol (corresponding to 0.53 equivalent of hydroxyl groups)

The component (KK2) thus obtained has the following characteristics:
   on average 7.1 ethylenically unsaturated double bonds per molecule
   a double bond content of 2.92 mol of double bonds per 1000 g of urethane acrylate solids
   on average 1.5 branching points per molecule
   16% by weight of cyclic structural elements, based on the solids content of the urethane acrylate.

The Preparation of a UV-Curable Coating Composition (K2)

A suitable stirred vessel was charged with 143.00 parts by weight of the above-described organic solution of urethane acrylate (KK2). Added to the initial charge over the course of 30 minutes was a mixture of 1.0 part by weight of Tinuvin® 292 (commercial HALS light stabilizer from Ciba Specialty Chemicals, based on a mixture of bis(1,2,2,6,6-pentamethyl-4-piperidinyl) sebacate and methyl (1,2,2,6,6-pentamethyl-4-piperidinyl) sebacate), 2.35 parts by weight Tinuvin® 400 (commercial light stabilizer from Ciba Specialty Chemicals, based on an 85% strength solution in 1-methoxy-2-propanol of a mixture of 2-(4-((2-hydroxy-3-dodecyloxypropyl)oxy)-2-hydroxyphenyl)-4,6-bis(2,4-dimethylphenyl)-1,3,5-triazine and 2-(4-((2-hydroxy-3-tridecyloxypropyl)oxy)-2-hydroxyphenyl)-4,6-bis(2,4-dimethylphenyl)-1,3,5-triazine),
0.8 part by weight of Lucirin® TPO-L (commercial photoinitiator from BASF Aktiengesellschaft, based on ethyl 2,4,6-trimethylbenzoylphenylphosphinate), 2.40 parts by weight of Irgacure® 184 (commercial photoinitiator from Ciba Specialty Chemicals, based on 1-hydroxycyclohexyl phenyl ketone), used in the form of 3.0 parts of an 80% strength solution in acetone, and 0.40 part by weight of a commercial 52% strength solution of a polyether-modified polymethylalkylsiloxane (=Byk® 325, commercial additive from Byk Chemie) at room temperature with continuous stirring and this was adjusted with 1-methoxyprop-2-yl acetate to a solids content of 51%. The resulting mixture was subsequently stirred at room temperature for 30 minutes.

2.2. Production of the Coated Thermoformable Sheet 2

The UV-curable coating composition (K2) was used in the same way as in Example 1 to produce a sheet bearing a coating.

The invention claimed is:
1. A process for producing moldings comprising:
   (I) producing a sheet (F) bearing a coating (B) by:
      (1) applying a pigmented coating composition (P) to an optionally pretreated surface (T1) of a thermoplastic support sheet (T) and,
      (2) applying a crosslinkable coating composition (K) which comprises a free-radically crosslinkable component (KK) and which after crosslinking to completion gives a transparent coating (KE),
      (3) drying and/or partially crosslinking the coating composition (K) applied in step (2) to give a coating (KT) as yet not crosslinked to completion,
   (II) inserting the sheet (F) produced in step (I) into an opened mold,
   (III) closing the mold and contacting a side (T2) of the thermoplastic support sheet (T) not facing the surface (T1) with a liquid or softened polymeric material (KM), and solidifying the polymeric material,
   (IV) removing the molding obtained in step (III) from the mold, and
   (V) crosslinking the coating (KT) to completion at any point in time in the course of steps (II) to (IV),
   wherein the crosslinkable coating composition (K) comprises the free-radically crosslinkable component (KK) which
   (i) comprises one or more oligo- and/or one or more polyurethane (meth)acrylates and
   (ii) comprises on average 2 to 10 ethylenically unsaturated double bond per molecule,
   (iii) has a number-average molecular weight of from 2500 to 5000 g/mol,
   (iv) has a double bond content of from 2.0 to 5.0 mol of double bonds per 1000 g of component (KK),
   (v) comprises on average per molecule >1 branching point,
   (vi) comprises 10%-50% by weight, based in each case on the weight of component (KK), of cyclic structural elements,
   (vii) comprises at least one aliphatic structural element having at least 6 carbon atoms in the chain, and
   (viii) one or more hydrogen bond forming structural elements selected from the group consisting of: urethane, biuret, allophanate, urea, carbamate, carbonate, amide, ether, and ester,
   wherein the free-radically crosslinkable component (KK) comprises the hydrogen bond forming structural element(s) in an amount such that:
   (A) a transparent coating (MT) produced from a mixture (M) but as yet not crosslinked to completion has a ratio of storage modulus G(MT)' to loss modulus G(MT)" of from 8 to 100, G(MT)' and G(MT)" having been measured at a temperature of 20° C. by rheological oscillation measurements using a plate/plate measuring system with a heating rate of 2° C. per minute and a circular frequency of $10 \text{ s}^{-1}$, and
   (B) a transparent coating (ME) produced from the mixture (M) and crosslinked to completion has a storage modulus E(ME)' of from $1.9*10^{7.0}$ to $3.7*10^{7.0}$ Pa, E(ME)' having been measured in the rubber-elastic range on free, completely crosslinked films having a layer thickness of 40 μm+/−10 μm by means of dynamic mechanical thermoanalysis with a heating rate of 2° C. per minute and a frequency of 1 Hz,
   the mixture (M) being obtained by mixing 100 parts of component (KK), at 70% in methyl ethyl ketone (corresponding to 143 parts of the 70% strength solution), with 2.4 parts of 1-hydroxycyclohexyl phenyl ketone (used in the form of 3.0 parts of an 80% strength solution in acetone) and 0.8 part of ethyl 2,4,6-trimethylbenzoylphenylphosphinate and also 1.0 part of a mixture of bis(1,2,2,6,6-pentamethyl-4-piperidinyl) sebacate and methyl (1,2,2,6,6-pentamethyl-4-piperidinyl)sebacate, 2.0 parts of a mixture of 2-(4-((2-hydroxy-3-tridecyloxypropyl)oxy)-2-hydroxyphenyl)-4, 6-bis(2,4-dimethylphenyl)-1,3,5-triazine and 2-(4-((2-hydroxy-3-dodecyloxypropyl)oxy)-2-hydroxyphenyl)-4, 6-bis(2,4-dimethylphenyl)-1,3,5-triazine (used in the form of 2.4 parts of an 85% strength solution in 1-methoxy-2-propanol), 0.2 part of a polyether-modified polydimethylsiloxane (used in the form of 1.7 parts of a solution in 7/2 xylene/monophenyl glycol, having a nonvolatiles fraction of 12.5%) and 70 parts of 3-butoxy-2-propanol
   wherein the free-radically crosslinkable component (KK) has been prepared using:
      isopropylidenedicyclohexanol;
      two or more of: hexamethylene diisocyanate, isophorone diisocyanate, and methylene bis(4-isocyanatocyclohexane), or the corresponding isocyanurates and/or biurets and/or allophanates of these isocyanates; and
      one or more of: hydroxyethyl acrylate and 4-hydroxybutyl acrylate; and
      optionally pentaerythritol tetraacrylate.

2. The process of claim 1, wherein the hydrogen bond forming structural element is selected from two or more of: urethane, biuret, allophanate, urea, carbamate, and amide groups.

3. The process of claim 1, wherein the free-radically crosslinkable component (KK) comprises more than 2 but not more than 10.0 double bonds per molecule and/or wherein the free-radically crosslinkable component (KK) further comprises aliphatic structural elements having 4 and/or 5 carbon atoms in the chain.

4. The process of claim 1, wherein the free-radically crosslinkable component (KK) comprises, as cyclic structural elements, monocyclic structural elements having 4 to 8 ring members and/or dicyclic and/or tricyclic and/or polycyclic structural elements having 7 to 18 ring members and/or wherein the cyclic structural elements are substituted.

5. The process of claim 1, wherein the free-radically crosslinkable component (KK) comprises as cyclic structural elements
   (i) cycloaliphatic structural elements and/or
   (ii) heterocyclic structural elements in which the number of heteroatoms per ring is 1 to 8 and in which the heteroatoms are selected from the group consisting of nitrogen, oxygen, sulfur, and combinations thereof,
   (iii) aromatic structural elements,
the amount of aromatic structural elements being not more than 10% by weight, based in each case on the weight of component (KK).

6. The process of claim 1, wherein the free-radically crosslinkable component (KK) comprises, as cyclic structural elements, tricyclodecane rings and/or cyclohexane rings and/or isocyanurate rings and/or triazine rings.

7. The process of claim 1, wherein the free-radically crosslinkable component (KK) comprises aliphatic structural elements having 6 to 18 carbon atoms in the chain.

8. The process of claim 1, wherein the branching points of the free-radically crosslinkable component (KK) are introduced via the use of isocyanates having a functionality of more than 2 and/or via the use of isocyanurate rings in the synthesis of component (KK).

9. The process of claim 1, wherein the free-radically crosslinkable component (KK) contains less than 5% by weight, based in each case on the weight of component (KK), of detectable free isocyanate groups.

10. The process of claim 1, wherein a solventborne or aqueous coating composition is used as pigmented coating composition (P).

11. The process of claim 10, wherein the pigmented coating composition (P) comprises
   (I) one or more solvents and/or water,
   (II) one or more binders, and
   (III) optionally at least one crosslinking agent,
   (IV) at least one pigment, and
   (V) optionally one or more auxiliaries and additives.

12. The process of claim 1, wherein the pigmented coating composition (P) is applied either in only one layer by means of a nondirected application method or in two or more layers, in which case the last of these layers is applied by means of a nondirected application method.

13. The process of claim 12, wherein the sheet (F) is thermoformed before step (II).

14. The process of claim 1, wherein the resulting molding is selected from the group consisting of an interior or exterior automotive bodywork component, a component for shipbuilding, a component for aircraft construction, and a component for household or electrical appliances.

15. The process of claim 1, wherein the hydrogen bond forming structural element comprises an allophanate, a biuret, or combinations thereof.

* * * * *